United States Patent [19]
Moreton et al.

[11] Patent Number: 5,835,133
[45] Date of Patent: Nov. 10, 1998

[54] OPTICAL SYSTEM FOR SINGLE CAMERA STEREO VIDEO

[75] Inventors: Henry P. Moreton, Oakland; Bryan E. Loucks, Los Altos Hills, both of Calif.

[73] Assignee: Silicon Graphics, Inc., Mountain View, Calif.

[21] Appl. No.: 590,347

[22] Filed: Jan. 23, 1996

[51] Int. Cl.$^6$ .................................................. H04N 13/02
[52] U.S. Cl. .................................. 348/49; 348/51; 348/54
[58] Field of Search .................................. 348/49, 51, 52, 348/53, 54, 57, 58, 59, 39, 36, 38; H04N 13/02

[56] References Cited

U.S. PATENT DOCUMENTS

| | | | |
|---|---|---|---|
| 4,523,226 | 6/1985 | Lipton et al. | 348/49 |
| 4,568,970 | 2/1986 | Rockstead | 348/49 |
| 4,575,207 | 3/1986 | August | 354/112 |
| 4,623,223 | 11/1986 | Kempf | 350/138 |
| 4,649,425 | 3/1987 | Pund | 358/88 |
| 4,709,263 | 11/1987 | Brumage | 358/88 |
| 4,717,239 | 1/1988 | Steenblik | 350/144 |
| 4,734,756 | 3/1988 | Butterfield et al. | 358/3 |
| 4,740,073 | 4/1988 | Meacham | 352/58 |
| 4,751,570 | 6/1988 | Robinson | 358/88 |
| 4,754,327 | 6/1988 | Lippert | 358/88 |
| 5,003,385 | 3/1991 | Sudo | 348/49 |
| 5,365,370 | 11/1994 | Hudgins | 359/464 |
| 5,430,474 | 7/1995 | Hines | 348/51 |

OTHER PUBLICATIONS

Sidney F. Ray, *Applied Photographic Optics, Imaging Systems for Photography, Film and Video*, Focal Press, London & Boston, pp. 469–484 (1988).

*Primary Examiner*—Brian Casler
*Assistant Examiner*—Luanne P. Dion
*Attorney, Agent, or Firm*—Blakely, Sokoloff, Taylor & Zafman

[57] ABSTRACT

A mechanism and method for recording stereo video with standard camera system electronics and a uniquely adapted optical assembly is disclosed. The optical assembly comprises left and right optical channels disposed to capture and project separate left and right images onto a single image sensor such that the boundary between the projected images is sharply delineated with no substantial overlap or gap. The viewpoints of the left and right optical channels are separated by a distance, d, such that the captured images are differentiated to produce a stereo image pair. By proper disposition of the left and right optical channels, stereo image pairs exhibiting full stereo overlap without keystone distortion are obtained. One image of the stereo pair is produced for visualization by the left eye and the other image is produced for visualization by the right eye. Alternatively, the images can be interrogated by a computer system for generating three dimensional position data. The image sensor is scanned in a standard fashion such that the left and right images are sampled by the video sampling circuitry of the camera unit at substantially the same time. In one mode, a pair of anamorphic lenses compress the left and right images along the axis of the image sensor scan lines so that each video field represents a stereo pair of images at a substantially unity anamorphic ratio and at an aspect ratio substantially equal to that of the image sensor. In a another mode, a conventional (non-distorting) lens is utilized and each video frame represents a pair of images having an aspect ratio equal to one-half that of the image sensor. A stereo playback mechanism and method is also disclosed.

19 Claims, 17 Drawing Sheets

OPTICAL SYSTEM FOR SINGLE CAMERA STEREO VIDEO

BACKGROUND OF THE INVENTION

(1) Field of the Invention

The present invention relates to the field of three dimensional image acquisition and display. More specifically, the present invention relates to stereo video generation and display.

(2) Prior Art

The ability to provide video or images in three dimensions offers many advantages. For instance, the ability to render three dimensional information can improve computer controlled environment simulation to provide more enhanced realistic, three dimensional, simulations. Further, the ability to readily record three dimensional information, using a camera system for example, is advantageous because then the data can be readily played back for three dimensional viewing and interaction and can also be used to compute 3D information about objects in scenes. Camera systems used in this manner capture "stereo video" images of an environment or model. One image is recorded for the left eye and a second image is recorded for the right eye.

One prior art method and mechanism that utilizes a camera system to gather three dimensional video employs two independent cameras that are separated by some distance. A stereoscopic effect is achieved by virtue of the parallax between the two camera views.

One such mechanism is described in U.S. Pat. No. 5,365,370, entitled "Three Dimensional Viewing Illusion with 2D Display", by Hudgins, and another in U.S. Pat. No. 4,734,756, entitled "Stereoscopic Television System", by Butterfield, et al. Each of two cameras record a scene roughly familiar to the subject matter that each human eye would perceive. Then, the images can be played back for viewing. However, this double-sensor system is a costly method for recording or producing stereo video because two separate camera recording units are required and they must be properly synchronized together. This often requires specialized equipment or custom cameras which require specialized control and integration.

Another prior art method and mechanism that utilizes a double-sensor system incorporated within a single camera to gather stereo video is illustrated in FIG. 1. Although only one physical camera unit is utilized, the camera unit employs two separate CCD (charge-coupled device) circuits $15a$ and $15b$ and two separate CCD video sampling circuits $25a$ and $25b$. The camera contains two slits $4a$ and $4b$ for allowing light $5a$ and $5b$ to pass through. The light is then focused by lens $10a$ and lens $10b$ onto two separate CCD circuits $15a$ and $15b$. These CCD circuits $15a$ and $15b$ are then scanned independently by the video sampling circuitry $25a$ and $25b$ to generate the stereo video output signals. The distance, d, separating slits $4a$ and $4b$ provides the stereo differentiation between the respective images projected on to CCD circuits $15a$ and $15b$. One similar system is disclosed in U.S. Pat. No. 4,751,570 entitled "Generation of Apparently Three Dimensional Images", by Robinson, which uses two separate CCD circuits, each of which is independently scanned to produce a left video signal and a right video signal. Robinson teaches the use of specialized electronics to time division multiplex the left and right video signals to produce a single video signal suitable for display by a commercially available monitor.

It is evident that a disadvantage of the prior art mechanism of FIG. 1 is that the camera unit produces two distinct video signals which must either be combined through the use of specialized electronics (as taught by Robinson) or otherwise independently processed for display. Also, the prior art mechanism of FIG. 1, being a double-sensor system, suffers from the additional cost of duplicated CCD and video sampling circuits. Most standard (i.e., non-stereo) video cameras are not equipped with separate CCD circuits or separate video sampling circuits, so the prior art mechanism of FIG. 1 requires specialized video electronics within the camera unit.

One prior art mechanism that overcomes the disadvantages of double-sensor systems like Robinson's is a single-sensor system relying on motion of the sensor relative to the object in view to generate a stereoscopic effect. As the sensor moves by the object (or vice-versa), images are obtained at different points in time, thereby producing a parallax between successive views which may be used to present a three dimensional effect to the viewer. However, this type of system is ineffectual for objects moving directly at or away from the sensor.

U.S. Pat. No. 4,754,327 entitled "Single Sensor Three Dimensional Imaging", by Lippert, teaches a single-sensor system relying on relative motion between sensor and object which overcomes the inability of such systems to provide stereoscopic views of objects moving directly at or away from the sensor. As the sensor moves toward an object the effects of radial expansion are detected and processed by a computer to produce a stereo image.

The primary disadvantage of single-sensor systems relying on relative motion between sensor and object is that once the relative motion stops, the stereo effect goes away. Furthermore, the rate at which the object moves relative to the sensor must be uniform and in constant proportion to the rate at which images are sampled. Otherwise, the parallax between successive views will vary, causing slower objects to appear further away than they actually are (due to reduced parallax) and faster objects to appear closer than they actually are (due to enlarged parallax). This effect, known as a pseudo-stereoscopic effect, is particularly problematic when it is the object rather than the camera which is in motion. While the camera can be mounted on a platform and moved in a tightly controlled manner about a stationery object, most real world objects (e.g., human beings and projectiles) exhibit more complex motions involving acceleration and jerk and in any event tend to move at varying speeds.

What is needed therefore, is a means to provide stereo video recording capability that avoids the costly electronics required by the double-sensor systems of the prior art and which does not rely on relative motion between sensor and object of the single-sensor prior art.

Accordingly, it is desirable to provide a cost effective mechanism and method for providing stereo video images within a single-sensor camera system wherein parallax between left and right views is obtained without requiring relative motion between object and camera. It is also desirable to provide the above within a standard camera system having standard electronics but with an uniquely adapted optical system for substantially simultaneously collecting a left and right image in stereo video format. It is further desirable to provide an uniquely adapted optical system for simultaneously projecting left and right images of a stereo image pair onto a single image sensor such that the projected images abut one another. Moreover, it is desirable to provide an uniquely adapted optical system for compressing left and right images of a stereo image pair prior to projection onto a single image sensor so that video fields comprising the left and right images in an aspect ratio substantially equal to the aspect ratio of the image sensor and with a substantially unity anamorphic ratio may be obtained. It is also desirable to provide a video playback mechanism for observing the recorded stereo video signals so that three dimensional images may be viewed on a display screen or similar mechanism. Furthermore, it is desirable to provide a stereo pair of images which are substantially free from keystone distortion and which exhibit substantial stereo overlap of objects at varying distances from the camera.

SUMMARY OF THE INVENTION

A mechanism and method of recording stereo video with standard camera system electronics and a uniquely adapted optical assembly is disclosed. The optical assembly provides a pair of optical channels disposed to capture and project left and right images onto a single image sensor such as a CCD circuit. The two optical channels have viewpoints that are separated by a distance, d, such that the images are differentiated to produce a stereo pair; one image is produced for visualization by the left eye and the other image is produced for visualization by the right eye. Alternatively, the images can be interrogated by a computer system for generating three dimensional position data (see, for example, "Three-Dimensional Computer Vision" by Faugeras, pp. 175–6, The MIT Press). In first and second modes of the present invention, the left and right images are simultaneously projected onto opposing halves of the single CCD circuit, such that the images abut one another. The single image sensor is then scanned in a standard fashion such that the left and right images are sampled by the video generation circuitry of the camera unit at substantially the same time. Since the time delay between sampling of the left and right images is minimized, the present invention effectively provides accurate stereo views of moving objects. In the first mode of the present invention, conventional lenses are employed to focus the left and right images onto the image sensor, and each video frame sampled therefrom comprises the left and right images constituting a stereo image pair.

Each constituent image of the image pair has an aspect ratio of approximately 2:3, that is, each image is 2 units wide and 3 units high. The aspect ratio of an imaging system is usually defined by the aspect ratio of its image sensor, that is, the ratio of the image sensor's height to its width. A typical imaging system will have an aspect ratio of approximately 4:3. This 4:3 or landscape aspect ratio is generally considered more pleasing than the 2:3 or portait aspect ratio and has become a convention. Consequently, a second mode of the present invention is disclosed which provides a stereo image pair in which the constituent left and right images may be presented in the conventional 4:3 aspect ratio.

In the second mode of the present invention, a pair of anamorphic lenses compress the left and right images in the axis along which the image sensor is scanned. In this manner, each image of the image pair, which would otherwise expose an entire 4:3 image sensor, is compressed into a respective 2:3 half of the sensor. It will be appreciated that video frames sampled from an image sensor so exposed will be distorted in the horizontal axis. By sampling every other scan line to obtain a video field rather than a video frame, each image is effectively compressed in the vertical axis, thereby restoring the resultant left and right images to their non-distorted condition. By displaying video fields rather than video frames, a 4:3 stereo image may be presented to the viewer under the second embodiment of the present invention.

In a third mode of the present invention, a blanking means is employed to alternately expose the entire single CCD circuit with either the left image or the right image. For each of the foregoing modes of the present invention, a method for achieving full stereo overlap between the left and right images without introducing differential keystone distortion between the two images is disclosed. A stereo playback mechanism and method for use with the first and second modes of the present invention is also disclosed.

DETAILED DESCRIPTION OF THE INVENTION

In the following detailed description of the present invention numerous specific details are set forth in order to provide a thorough understanding of the present invention. However, it will be obvious to one skilled in the art that the present invention may be practiced without these specific details. In other instances well known methods, procedures, components, and circuits have not been described so as not to unnecessarily obscure aspects of the present invention.

Figure 1:
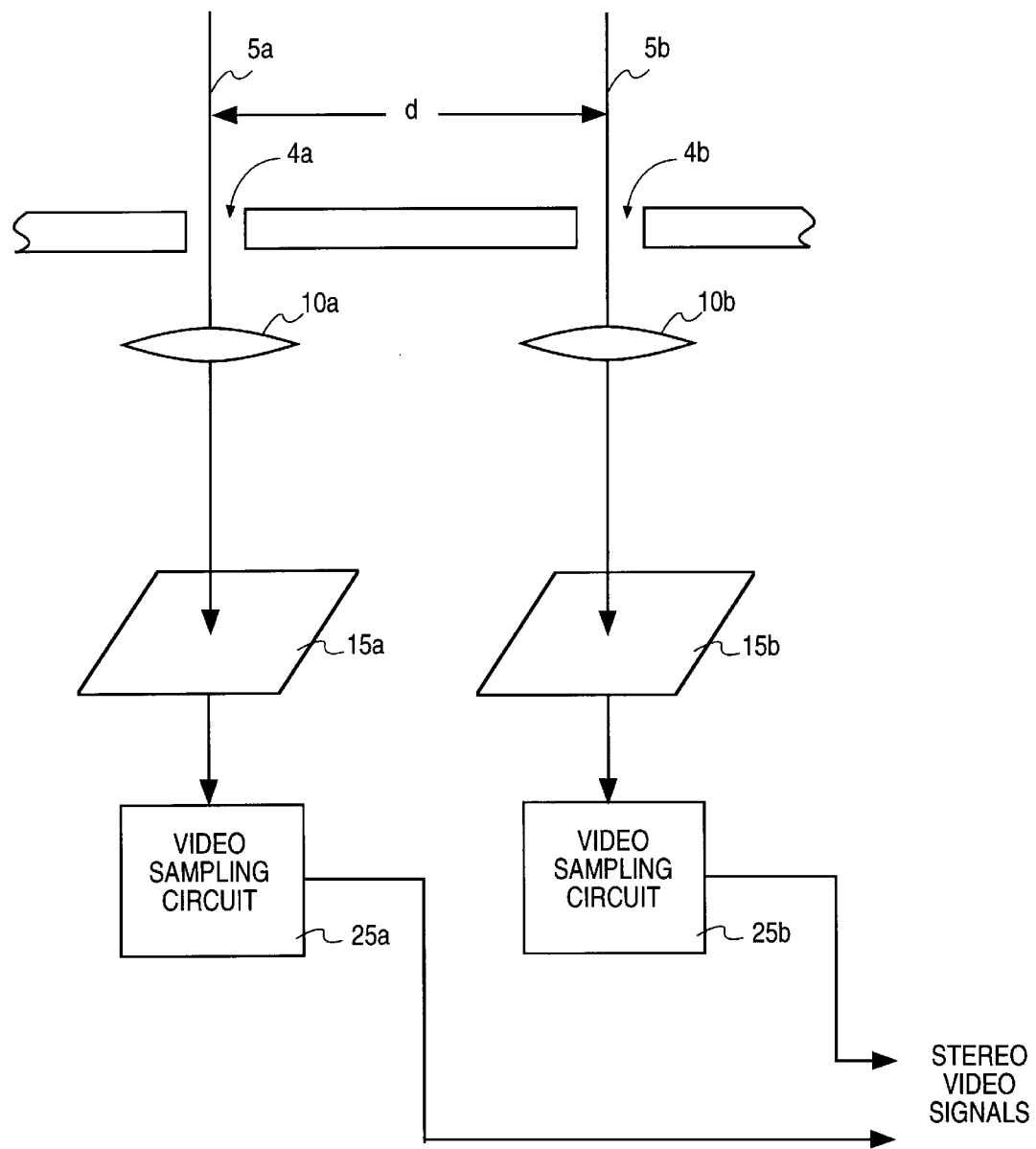
FIG. 1 illustrates a dual CCD circuit prior art stereo video camera unit.
Figure 2A:
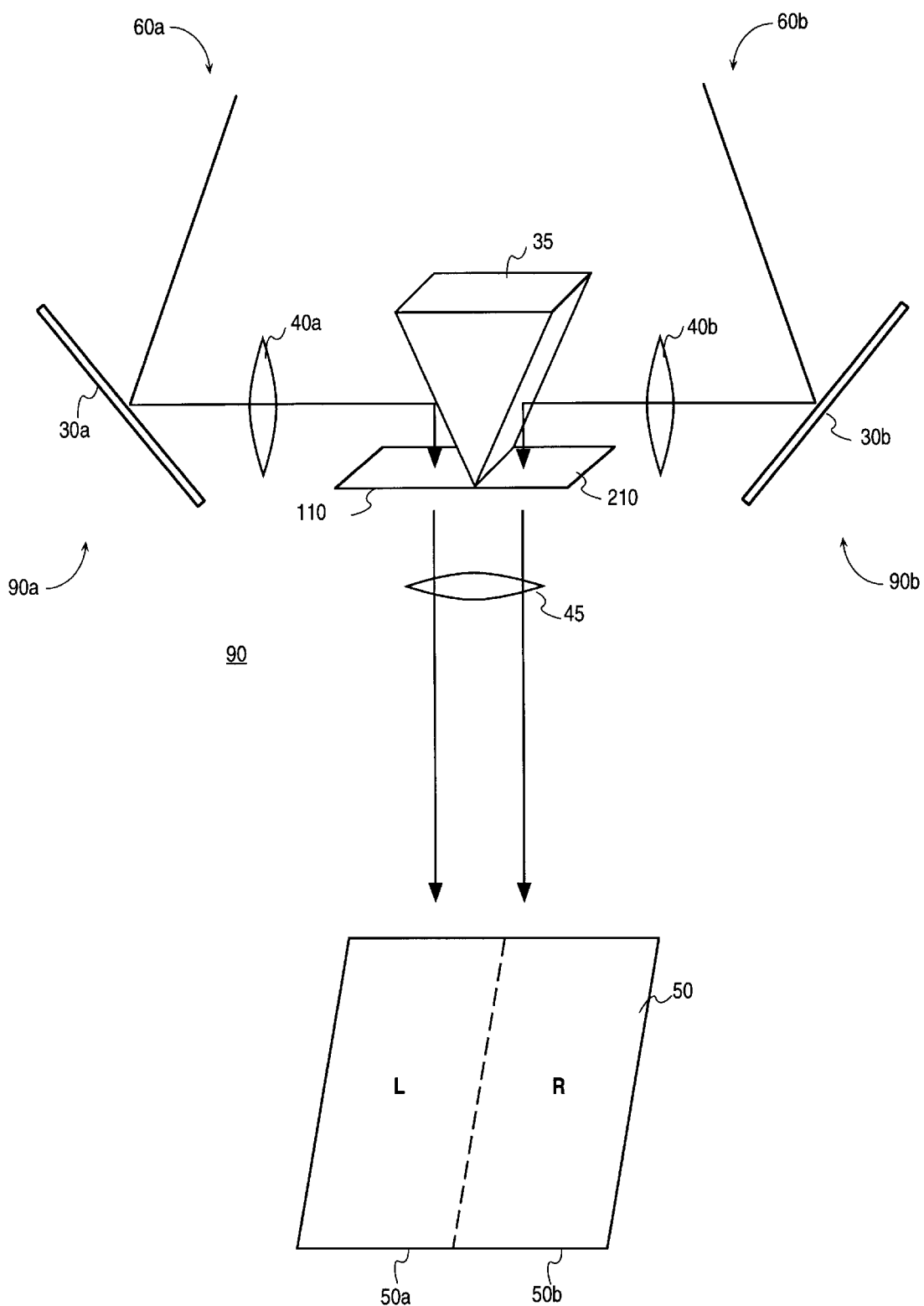
FIG. 2A illustrates a first embodiment of the present invention single image sensor stereo video camera for generating dual image frames.

A first embodiment of the present invention is shown in FIG. 2A. This embodiment provides an optical system that can be adapted to operate with electronics found in a standard video camera. Herein, standard video camera electronics refers to circuitry found within a camera system having a single charge coupled device circuit (CCD) which is sampled via well known video sampling circuitry to generate video signals in standard well known formats. The output video signal can be either digital or analog. Although a CCD is often referred to herein, it will be appreciated that the CCD could be replaced with a variety of well known and conventional image sensors which are used in conventional video camera electronics and can include infrared sensors or other photosensitive devices.

Figure 2B:
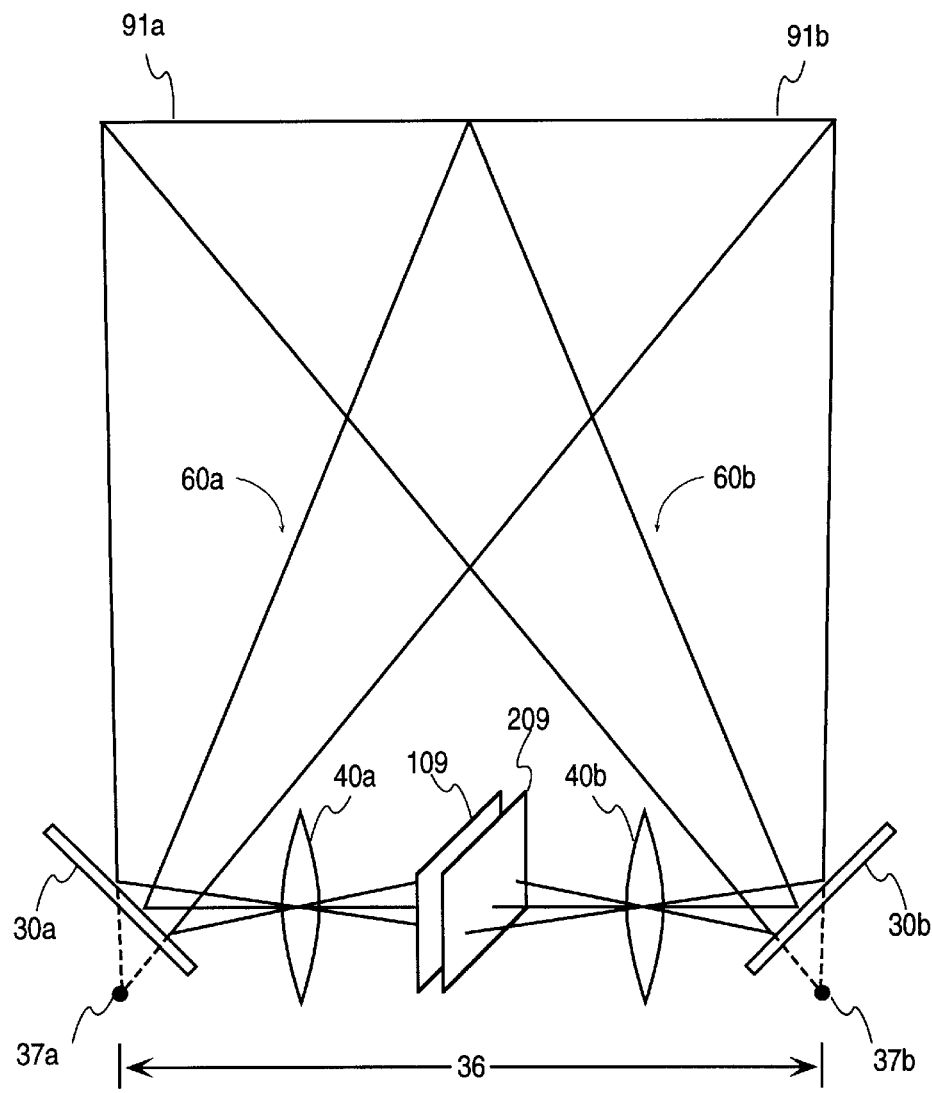
FIG. 2B illustrates the first embodiment of the present invention in which optical elements have been removed to emphasize the manner in which stereo image pairs are produced.

In FIG. 2A, light path 60a corresponds to the center of the field of view of the left channel 90a of optical assembly 90. Similarly, light path 60b corresponds to the center of the field of view of the right channel 90b of optical assembly 90. Left and right images received via respective light paths 60a and 60b constitute a stereo image pair. In FIG. 2B, reflective element 35 and lens 45 have been removed and left and right object planes 91a and 91b added to emphasize the manner in which the stereo image pair is detected by the optical assembly 90 of FIG. 2A. Viewpoints 37a and 37b of FIG. 2B are the points from which the object appears to be observed by the respective left and right optical channels 90a and 90b of FIG. 2A. The left and right optical channels (90a and 90b) are disposed so that a predetermined distance 36 separates viewpoints 37a and 37b, thereby differentiating images captured by the left and right optical channels into a stereo image pair.

Referring to FIG. 2B, images received along light paths 60a and 60b are reflected by reflectors 30a and 30b, respectively and pass through conventional rectilinear imaging lenses 40a and 40b toward planes 109 and 209. Each of the imaging (or focusing) lenses, 40a and 40b, is adjustable left or right along its optical axis in order to produce a focused image at plane 109 for lens 40a and at plane 209 for lens 40b. In practice the optical axes of lenses 40a and 40b are colinear and planes 109 and 209 are coincident. Returning now to FIG. 2A, the reflecting structure 35 is composed of two reflecting surfaces disposed at 90 degrees to one another and at 45 degrees to the optical axes of lenses 40a and 40b. The two reflecting surfaces of the reflecting structure 35 join at a common edge to define a line lying within planes 109 and 209 of FIG. 2B. The purpose of the reflecting structure 35 is to fold the light paths from 40a and 40b and thereby shift the locations of the images formed at planes 109 and 209 in the absence of 35 to their new locations 110 and 210. It will be observed that these new locations 110 and 210 are coplanar and that the images reflected thereto constitute a stereo pair. It will be further observed that the images formed at planes 110 and 210 abut one another. Herein, abut means that the demarcation between the images is sharp, preferably with no overlap or gap although negligible overlap or gap, the width of one image sensor pixel for example, may be tolerated. The benefit of this condition is to maximize the useful amount of the image area. Any overlapped portions of the images are not useful in a stereo sense. If the geometric conditions described above are not met then either an image overlap or a gap between the two images will result. Both conditions result in a less than maximum utilization of the image area. If the image sensor could be placed at the 90 degree vertex of 35 without any interference with the light paths, the stereo optical system would be complete. As a practical matter such a placement is rarely possible so a means to transfer the stereo image pair from planes 110 and 210 to the image sensor plane is needed. In this system, that function is performed by lens 45. This lens, referred to herein as a projecting lens, simply projects an image of the stereo pair onto the image sensor 50, whereupon the left and right images constituting the stereo image pair continue to abut one another. The image transfer may be accomplished at a magnification of unity or any other convenient value. This ability to select the magnification allows for a match between the image sensor size and the size of the images at planes 110 and 210.

It will be observed that if the stereo pair is imaged onto a typical 4:3 aspect ratio image sensor that each individual image of the stereo pair will cover only one-half of the sensor area and, therefore, that the aspect ratio of each individual image as utilized by the sensor will have an aspect ratio equal to one-half that of the image sensor, in this case 2:3. The resulting stereo image as observed on the final display will, therefore, also have an aspect ratio of 2 units wide by 3 units high.

Because both left and right images are projected onto the single image sensor 50 simultaneously, each scan line of the image sensor contains video data from both the left and right images. Since the scan lines are sampled sequentially along their lengths, one scan line after another, the time delay between the sampling of the left and right images is equal to approximately one-half the amount of time required to sample any one scan line. Thus, this embodiment of the present invention is able to sample both the left and right images within a single sampling cycle of the image sensor 50 and acquire electronic representations of the left and right images substantially simultaneously. This effectively eliminates the problem of pseudo-stereo effect resulting from object motion which is associated with prior art techniques which use time separated left and right image acquisition. The images cast on the image sensor 50 are sampled therefrom and output as a video signal in the conventional manner. Thus, the optical system of the present invention can be effectively adapted to a conventional, single CCD circuit video camera to produce a single video signal containing stereo video information. During playback, the left and right images are split and displayed for stereo viewing. As will be discussed further, within the first embodiment of the present invention, the stereo output is taken in video frames of recorded data wherein each video frame comprises separate left and right images and is obtained by sampling the full information content of the image sensor.

Figure 3:
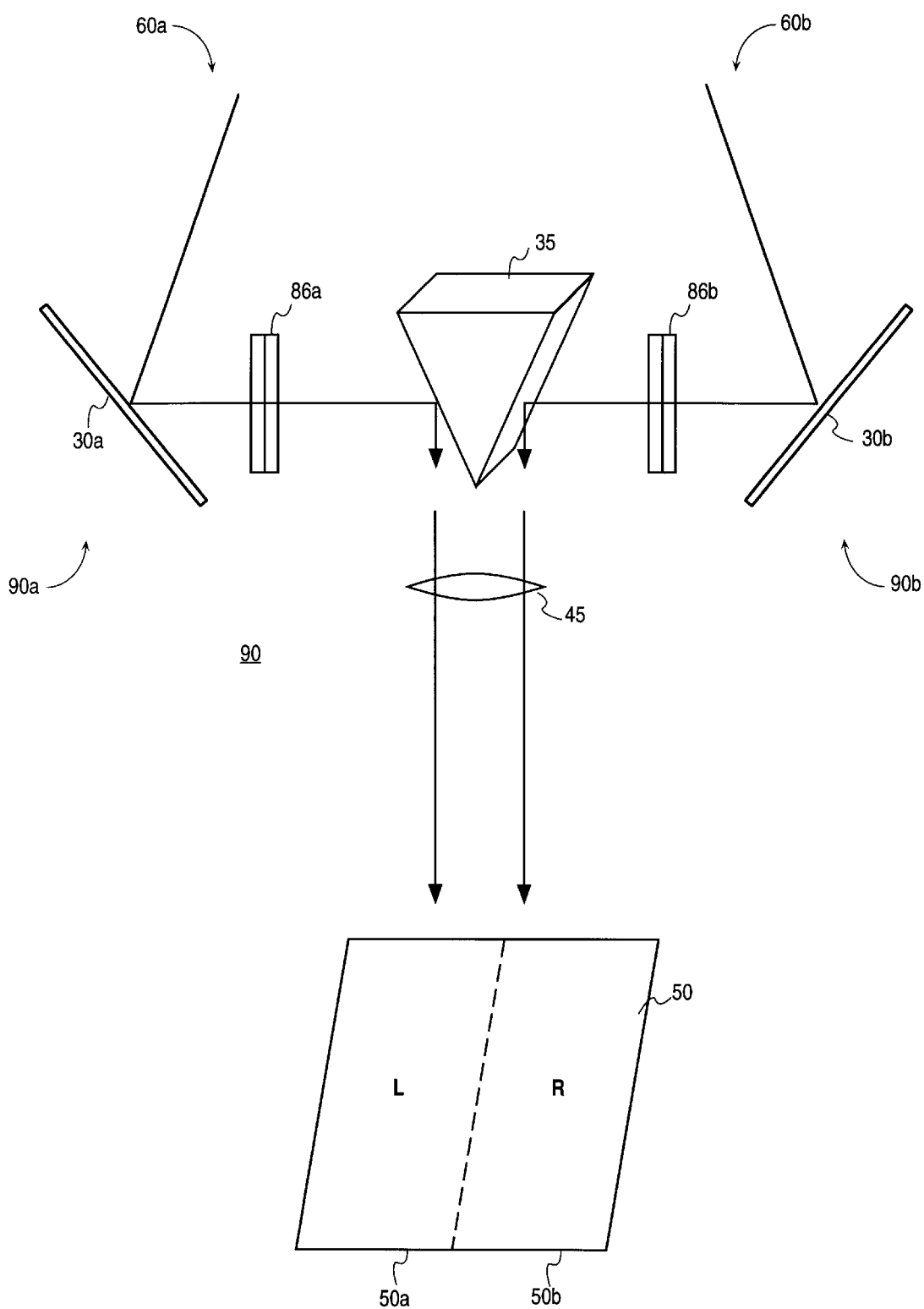
FIG. 3 illustrates a second embodiment of the present invention single image sensor stereo video camera for generating dual image fields.

In a second embodiment of the present invention, shown in FIG. 3, the conventional rectilinear imaging lenses 40a and 40b of FIG. 2A are replaced by anamorphic imaging optics 86a and 86b. Anamorphic lenses are well known and widely used in the motion picture industry in processes such as Cinemascope and the details of their design will not be further discussed here. Their function is to produce an image which is a distorted representation of an object. This type of distortion is referred to as anamorphic distortion and its nature is usually to produce an image with one magnification in one image direction and a different magnification in the image direction perpendicular to the first. The ratio of the two magnifications is known as the anamorphic ratio, and, herein, an image that has been effectively magnified or compressed equally along its two perpendicular axes is referred to as having a unity anamorphic ratio. One purpose of introducing anamorphic distortion is to permit a wide horizontal viewing angle and a narrower vertical viewing angle, an aspect ratio of typically 8:3, to be efficiently recorded on a sensor area whose aspect ratio is about 4:3. In this embodiment of the present invention, the use of anamorphic lenses 86*a* and 86*b* with an anamorphic ratio of 2:1 will result in the images composing the stereo pair at 110 and 210 to each have a 4:3 aspect ratio image squeezed into the 2:3 aspect ratio portion of the sensor used for each of the images forming the stereo pair. The function of projecting lens 45 is the same as in the first embodiment. For the compressed images produced by the second embodiment to be displayed in a non-distorted fashion, a method of compensation must be introduced in the display apparatus which will restore the images to a unity anamorphic ratio; a process known as image rectification. Because the images projected onto respective halves of the image sensor are actually 4:3 aspect ratio images compressed into 2:3 portions of the sensor, rectifying the compressed images to achieve unity anamorphic ratio also restores the 4:3 aspect ratio of the images. Thus, through the use of image rectifying display techniques, the second embodiment of the present invention is able to produce a stereo display of conventional 4:3 aspect ratio using a single conventional 4:3 aspect ratio image sensor. While specific anamorphic and aspect ratios have been mentioned in this discussion, they are for illustrative purposes only. There is nothing in the nature of the invention which precludes the use of any desired anamorphic ratio or any desired aspect ratio. Furthermore, although anamorphic lenses have been described, those skilled in the art will appreciate that other optical elements may be employed to produce the desired anamorphic effect. Also, those skilled in the art will appreciate that the anamorphic effect may be introduced at various points along the respective paths of the left and right optical channels. For example, lenses 86*a* and 86*b* could be replaced by conventional rectilinear imaging lenses and projecting lens 45 could be replaced with an anamorphic lens to provide the desired anamorphic ratio.

As discussed with respect to the first embodiment, the second embodiment of the present invention is able to substantially simultaneously sample two separate images (left and right) within a single sampling of the image sensor 50. Similarly, the second embodiment of the present invention overcomes the problem of pseudo-stereo effect resulting from object motion which is associated with prior art techniques which use time separated left and right image acquisition. Furthermore, the left and right images projected onto the image sensor 50 of the second embodiment abut one another in the manner described in the first embodiment. The images cast on the image sensor 50 are sampled therefrom and output as a video signal in the conventional manner. As will be discussed further, within the second embodiment of the present invention, the stereo output is taken in fields of recorded data wherein each field represents a single sampling of either the odd or the even scan lines of a CCD circuit and each field contains a separate left and right image.

Figure 4:
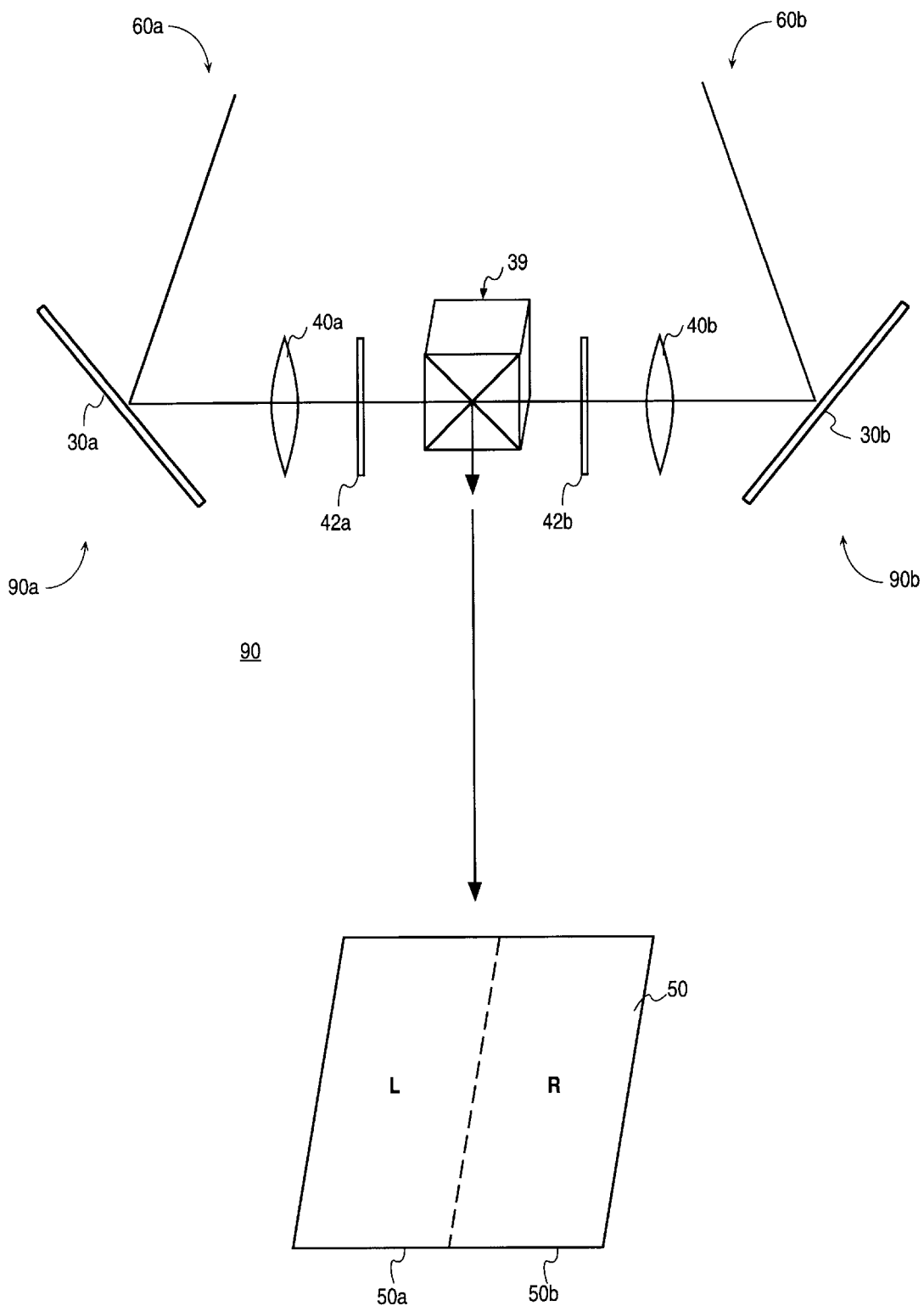
FIG. 4 illustrates a third embodiment of the present invention single image sensor stereo video camera for generating dual image frames using a blanking lens.

FIG. 4 illustrates a third embodiment of the present invention that utilizes an optical system comparable to the first embodiment shown in FIG. 2A, but includes blanking lenses 42*a* and 42*b* that act to prevent images from exposing the single image sensor 50. Various methods for implementing blanking lenses 42*a* and 42*b*, including shuttering and polarization techniques, are known in the art and will not be discussed further herein. Also, in this embodiment, reflective element 35 and lens 45 of the first and second embodiments are replaced by an image splitter 39 which is disposed to project the left and right images individually onto the entire image sensor 50. Image splitters useful for this purpose are well known in the art and their design will not be discussed herein. The image projected onto the image sensor 50 is alternated between the left and right images according to the state of the blanking control lenses 42*a* and 42*b*. For example, when lens 42*a* is driven opaque (i.e., blanked) and 42*b* is cleared, the right image is permitted to expose the entire image sensor 50 while the left image is prevented from exposing the image sensor 50. After this image is sampled by the video circuitry (described below), the lens 42*a* is cleared and 42*b* is driven opaque and the left image is permitted to expose the entire image sensor 50 which is then sampled. In such manner, the left and right images corresponding to a stereo pair are sampled at different times, unlike the first and second embodiments of the present invention. The third embodiment of the present invention can be implemented to operate within a standard video camera unit using a single CCD circuit.

It will be appreciated that while the third embodiment of the present invention provides high resolution image generation since the entire image sensor 50 is used to sample a single left or right image, it is susceptible to the pseudo-stereo effect when monitoring moving objects. This occurs because the object's motion between the left and right image is improperly interpreted as depth information within the two stereo images.

Figure 5A:
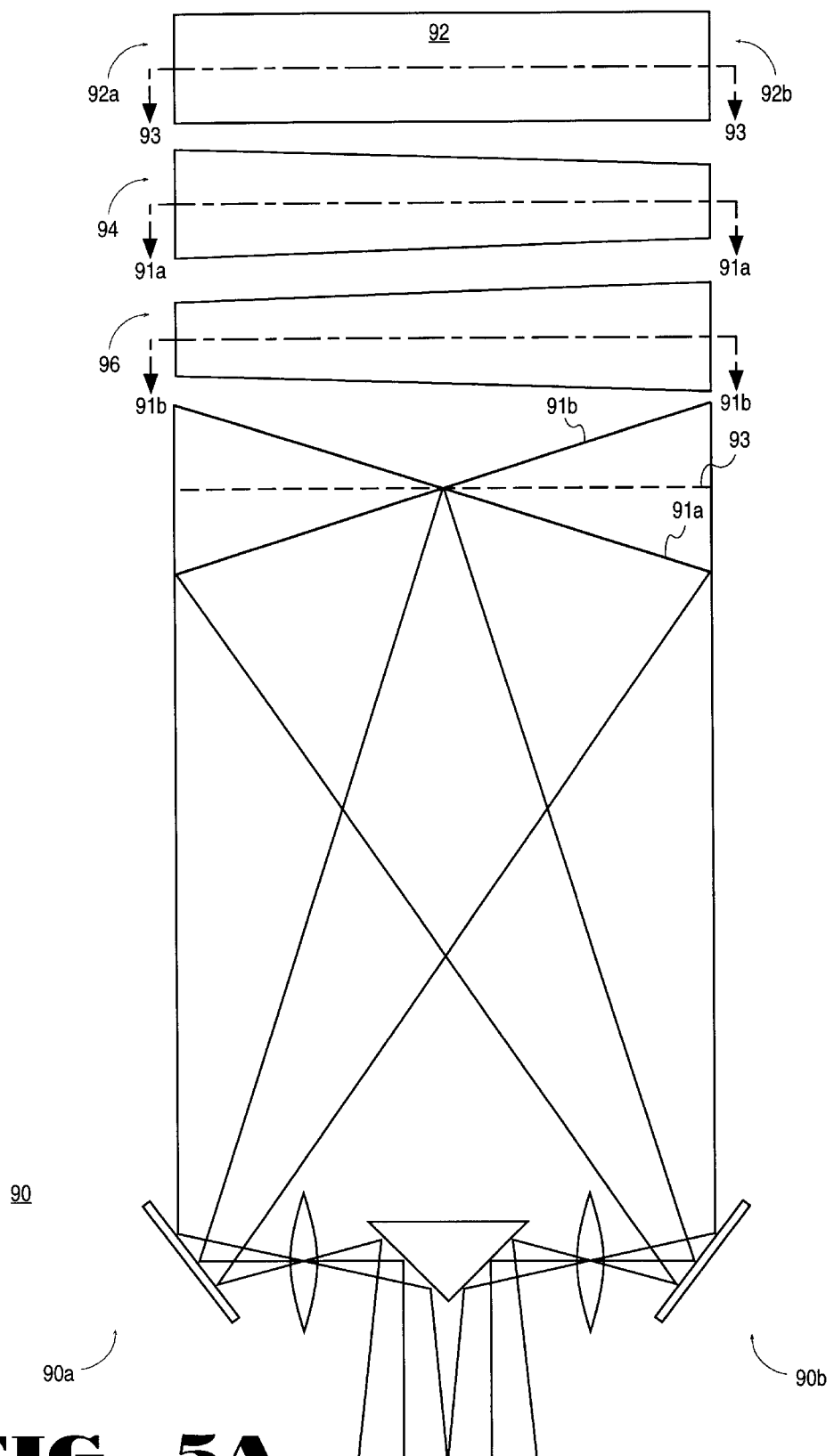
FIG. 5A illustrates an optical arrangement of the present invention in which there is substantial stereo overlap, but which suffers from differential keystone distortion.
Figure 5B:
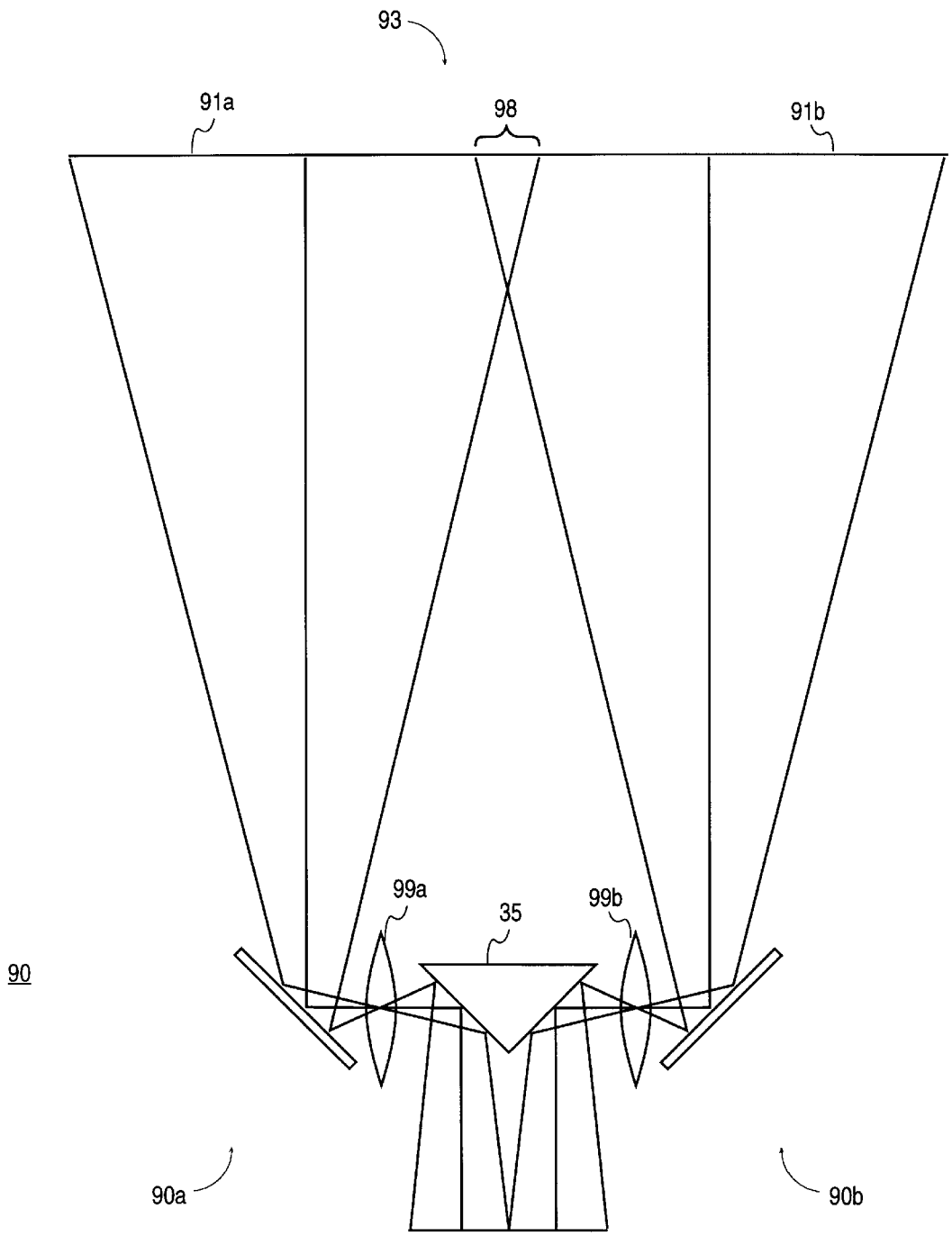
FIG. 5B illustrates an optical arrangement of the present invention in which differential keystone distortion is eliminated, but which exhibits reduced stereo overlap.
Figure 5C:
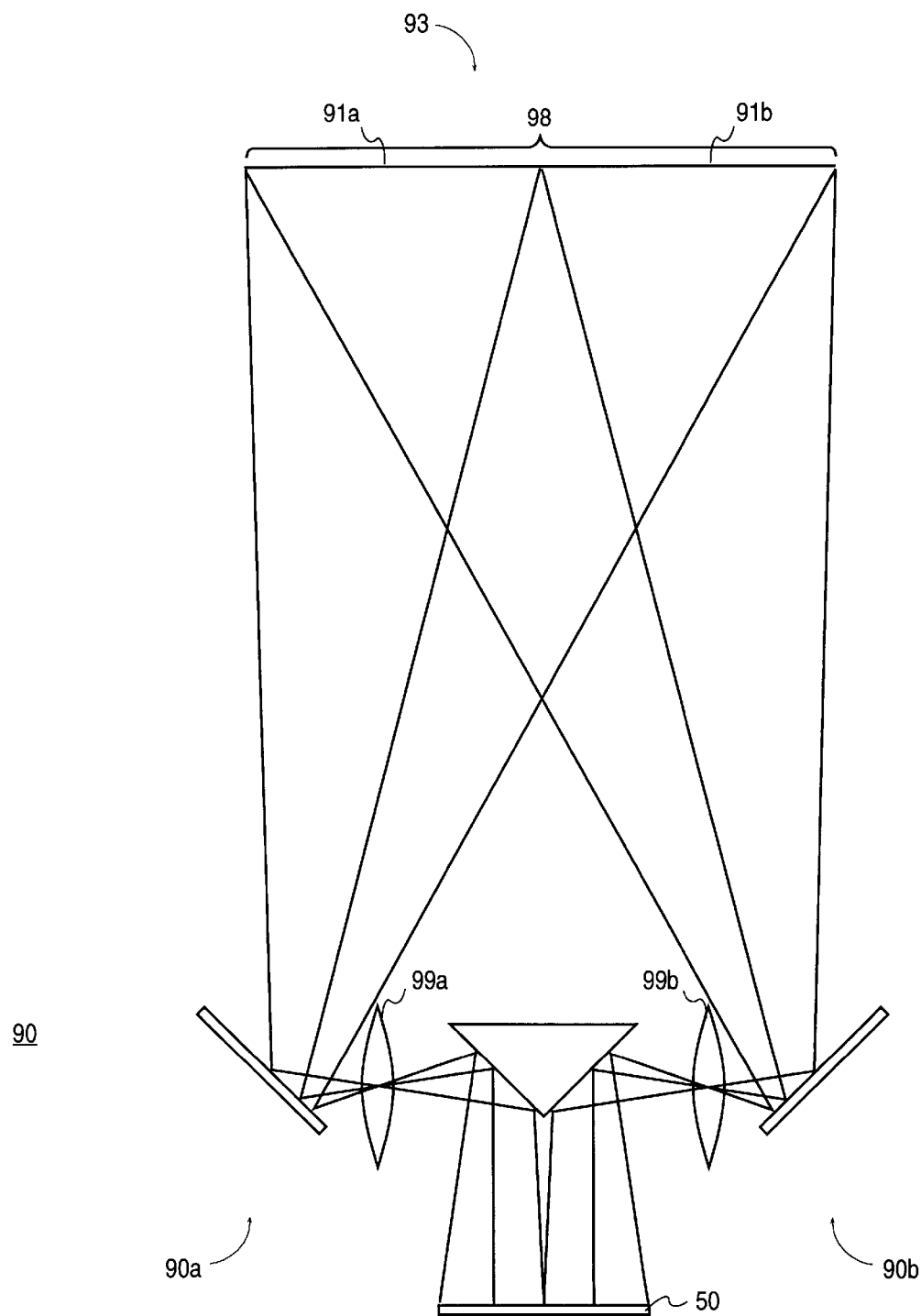
FIG. 5C illustrates an optical arrangement of the present invention in which differential keystone distortion is eliminated and which provides substantial stereo overlap.

FIGS. 5A, 5B and 5C relate to differing arrangements of the left and right optical lens assemblies of the present invention. As previously mentioned, an object of the present invention is to provide distortion-free left and right images, exhibiting substantial stereo overlap, of objects at varying distances from the camera. Herein, stereo overlap refers to the extent to which objects appearing in the left image also appear in the right image.

FIG. 5A illustrates an optical arrangement of the present invention in which there is substantial stereo overlap between the left image 94 and right image 96 of an object 92 in object plane 93, but in which both images suffer from a distorting effect known as keystone distortion. Referring to the left image 94, because the left object plane 91*a*, corresponding to the left optical channel 90*a* of the optical assembly 90, is not coplanar with the plane 93 of the object 92, the left side 92*a* of the object 92 appears nearer than the right side 92*b* of the object 92. Conversely, referring to right image 96, because the right object plane 91*b*, corresponding to the right optical channel 90*b* of the optical assembly 90, is not coplanar with the plane 93 of the object 92, the right side 92*b* of the object 92 appears nearer than the left side 92*a* of the object 92. When the left and right images (94 and 96) are viewed together, the resultant stereo image is said to suffer from differential keystone distortion.

FIG. 5B shows an optical arrangement in which the left and right optical lens assemblies (90*a* and 90*b*) are disposed so that their respective object planes (91*a* and 91*b*) are coplanar with one another and coplanar with the plane 93 of the object. In this configuration, keystone distortion is eliminated, but the region of stereo overlap 98, is greatly reduced. Because only objects appearing in the region of stereo overlap 98 are susceptible to 3D viewing and measurement, this small stereo overlap is undesirable.

Figure 5D:
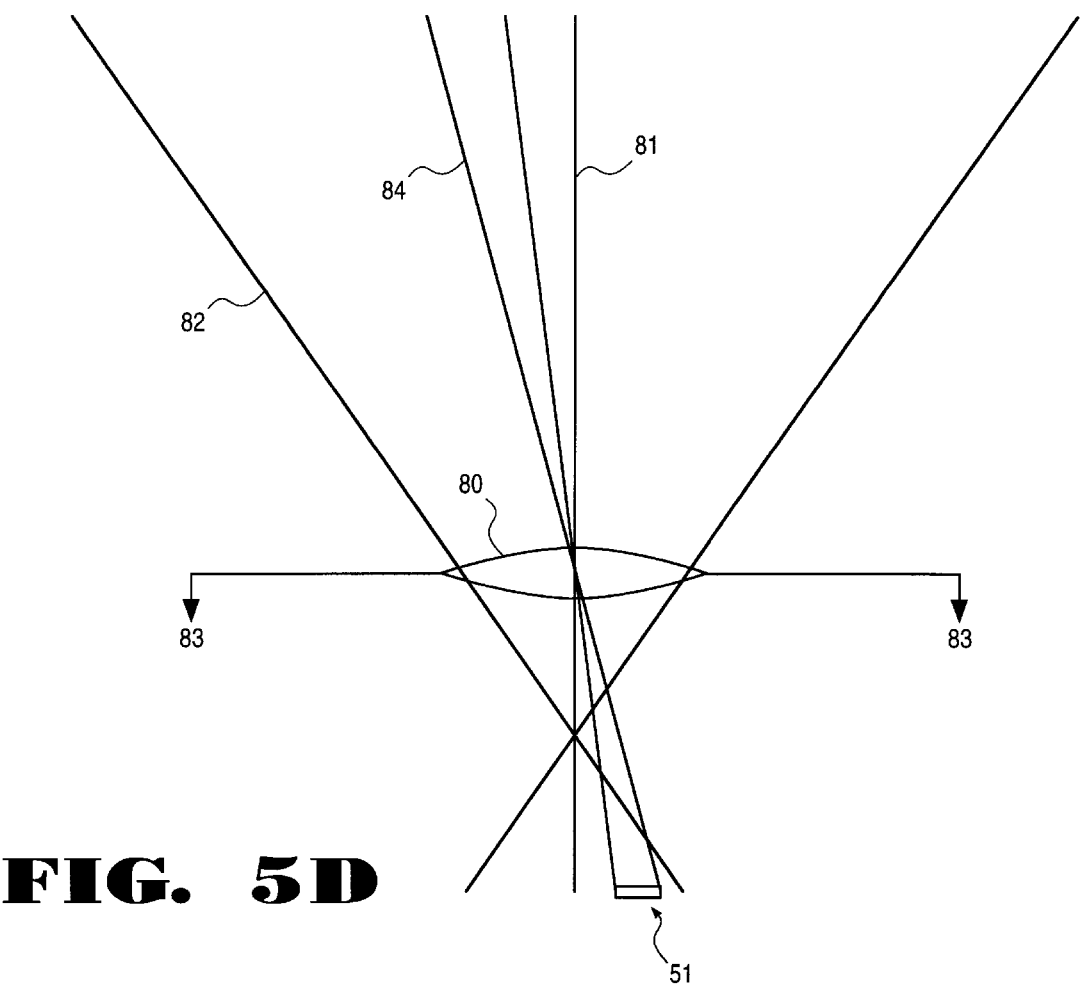
FIG. 5D illustrates translation of a focusing lens to project different portions of the field of view of the lens onto an image sensor.

FIG. 5C shows an optical arrangement which achieves full stereo overlap 98 of the left and right images without undesirable keystone distortion. By translating the left and right focusing lenses (99a and 99b) perpendicular to their optical axes, the left and right object planes can be made coincident, that is, coplanar and centered at the same point. As a result, distortion-free left and right images corresponding to coincident left and right object planes (91a and 91b) are obtained. FIG. 5D further illustrates the manner in which this is accomplished. Lens 80 has a field of view shown generally at 82 of which only a portion 84 is projected onto an image sensor 51. As lens 80 is translated along line 83 (perpendicular to lens 80's optical axis 81), different portions of the initial field of view 82 of the lens 80 are projected onto the image sensor 51. Returning now to FIG. 5C, by translating the left and right focusing lenses (99a and 99b) in a direction perpendicular to their optical axes, different portions of their respective fields of view may be projected onto the image sensor 50. In this manner, the left and right object planes corresponding to portions of the respective fields of view of focusing lenses 99a and 99b can be made coincident. By translating the left and right focusing lenses (99a and 99b) to different positions, the distance between the coincident left and right object planes (91a and 91b) and the camera can be adjusted while maintaining substantial stereo overlap 98 of the distortion-free left and right images.

Figure 6:
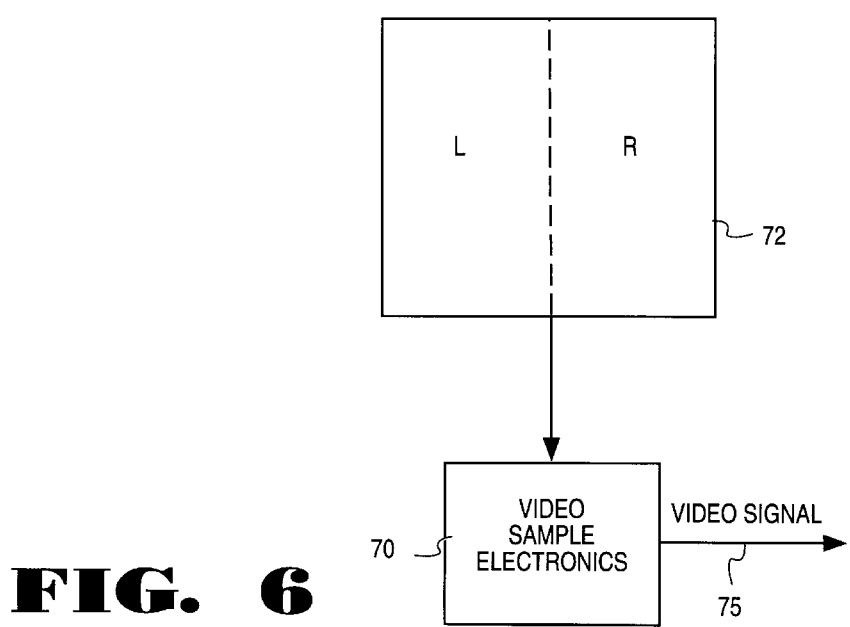
FIG. 6 is an illustration of the interface between a single CCD circuit and the video sampling electronics of the first, second and third embodiments of the present invention.

FIG. 6 illustrates a standard video sampling circuit 70 that is operable within the first, second and third embodiments of the present invention and in which image sensing is performed by a single CCD circuit 72. The sampling circuit 70 is coupled to sample the CCD circuit 72 by either interlaced or progressive scan. In a camera employing an interlaced-scan video sampling circuit, the CCD circuit 72 is scanned across rows to generate video fields at an exemplary rate of 60 Hz. A first field is generated by sampling the odd (or even) rows at an exemplary rate of 30 Hz and then a second field is generated sampling the even (or odd) rows, also at an exemplary rate of 30 Hz. In conventional video signal representation, the two fields together constitute a single frame. Frames produced by an interlaced-scan video sampling circuit, because they are constituted by two 30 Hz fields, are themselves generated at an exemplary rate of 30 Hz. Alternatively, frames may be generated at a 30 Hz rate by a progressive-scan sampling circuit. In a camera employing progressive-scan sampling electronics, the entire CCD circuit 72 is scanned row by row every 30 Hz cycle. In both the interlaced-scan and the progressive-scan implementations, the video signal 75 generated by the video sampling circuit 70 can be either analog or digital in form. It will be appreciated that the embodiments of the present invention can operate within scan rates that are slower or faster than the exemplary rates described above.

Figure 7A:
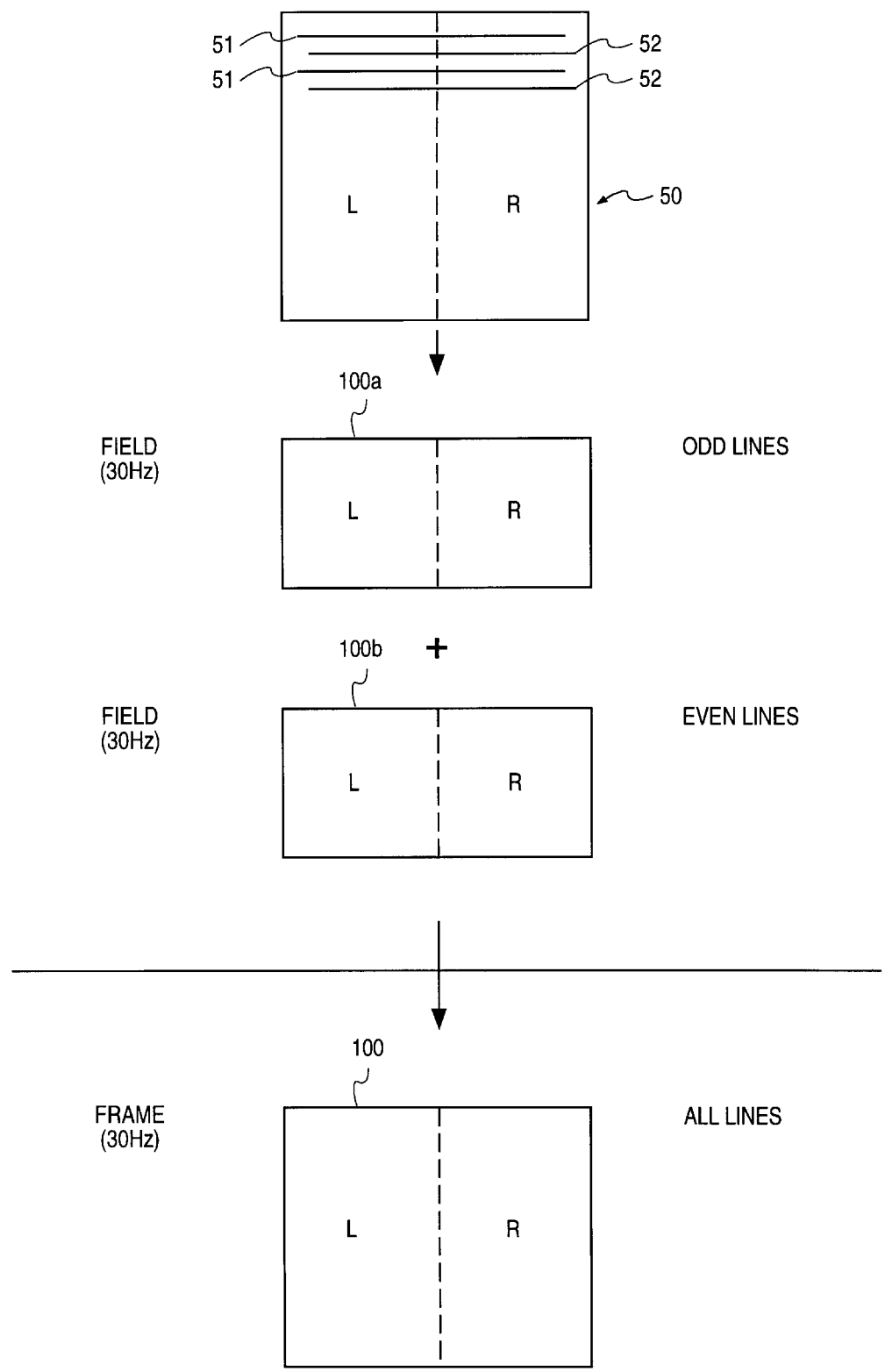
FIG. 7A is an illustration of a video format of the image generation techniques employed by the first embodiment of the present invention using frames.

FIG. 7A illustrates a video format diagram of the present invention for displaying stereo video signals that are generated by the first embodiment of the present invention. While the discussion below describes an implementation employing interlaced-scan sampling electronics, it will be appreciated by those skilled in the art that progressive-scan sampling electronics may also be used. As shown, left and right images are projected onto the single CCD circuit 72. Assuming the CCD circuit 72 to have an exemplary 4:3 aspect ratio, each of the images projected thereon would have a 2:3 aspect ratio. A first video field 100a comprises a left and a right image and is obtained by sampling the odd scan lines 51 of the single CCD circuit 72. The second video field 100b also comprises a left and right image and is obtained by sampling the even scan lines 52 of the single CCD circuit 72. Together video fields 100a and 100b comprise the entire interlaced frame 100. It will be appreciated that the left and right images comprised by fields 100a and 100b are compressed and thereby distorted in the vertical axis by virtue of the reduced number of constituent scan lines. In an exemplary embodiment, the first and second fields each become available at a 30 Hz rate, thereby providing an overall field update rate of 60 Hz. In order to reproduce the images without the distorting effect of vertical compression, the fields are either displayed in interleaved format (odd/even lines displayed successively in time) or combined together and displayed concurrently as a single frame. In either method, an image frame 100 is available at an exemplary 30 Hz rate in this embodiment and includes both a left and a right image. For stereo display, the left and right images can be separated and respectively displayed to the left and right eyes. When displayed in frame format, the left and right images retain their exemplary 2:3 aspect ratio.

The full height frame 100 of the first embodiment includes a relatively high resolution pair of images (because both odd and even scan lines are present within the frame), however, as previously discussed, each image of the stereo image pair has an aspect ratio equal to only one-half that of the image sensor. Because the left and the right images are projected onto the single CCD circuit 72 simultaneously, the left and right images of an image pair are sampled by the video sampling electronics at substantially the same moment in time, with one image lagging the other by only one-half the time period required for a single row of the CCD circuit 72 to be scanned.

Figure 7B:
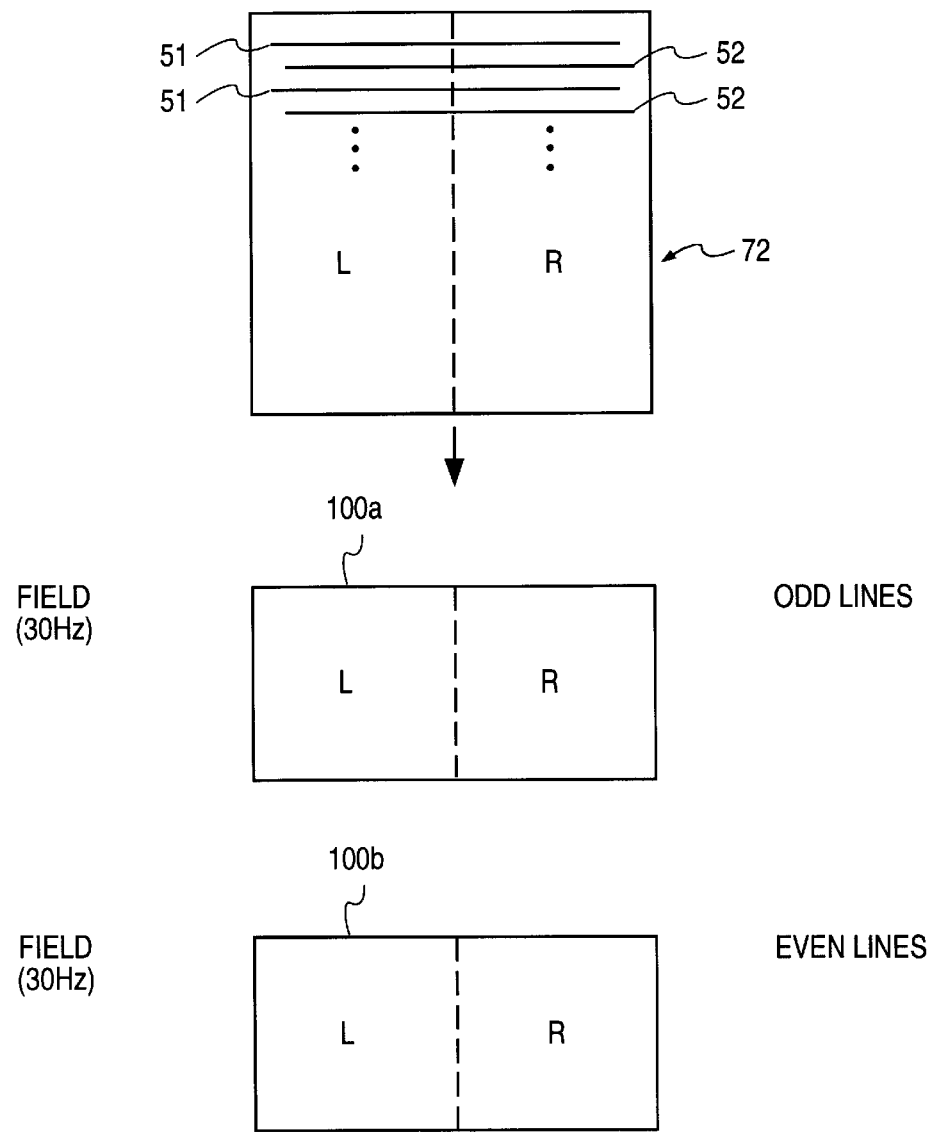
FIG. 7B is an illustration of a video format of the image generation techniques employed by the second embodiment of the present invention using fields.
Figure 9A:
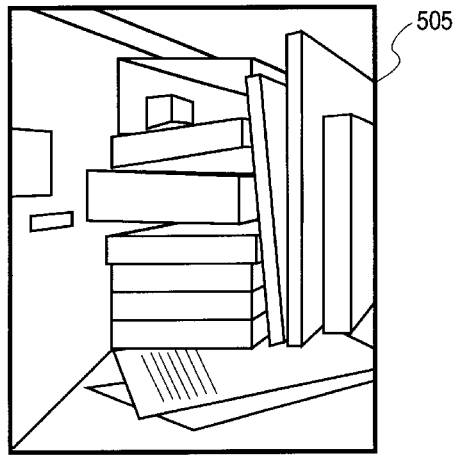
FIGS. 9A and 9B illustrate left and right frame images recorded onto a single CCD circuit using the second embodiment of the present invention.
Figure 9B:
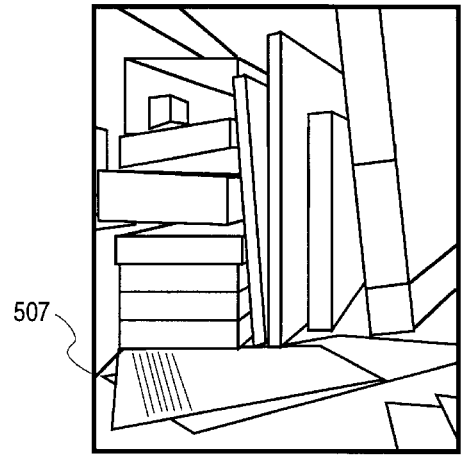

FIG. 7B illustrates a video format diagram of the present invention for displaying stereo video signals that are generated by the second embodiment of the present invention. Since the images projected by the second embodiment have been compressed in the horizontal axis by anamorphic lenses 86a and 86b of FIG. 2B, the images appear elongated in the vertical direction. For example, refer to FIGS. 9A and 9B which illustrate a sample left image 505 and right image 507 projected onto the CCD circuit 72 of the second embodiment. Assuming the CCD circuit 72 to have an exemplary aspect ratio of 4:3, the left and right images projected thereon will have an aspect ratio of 2:3. The anamorphic lenses 86a and 86b of the second embodiment, while allowing capture of left and right images that would otherwise individually have a 4:3 aspect ratio and cover the entire CCD circuit 72, act to distort the captured images so that they may be projected onto respective 2:3 halves of the CCD circuit 72. As FIG. 7B illustrates, in order to compensate for the anamorphic distortion produced by the anamorphic lenses and to present images having unity anamorphic ratio, the images displayed in the second embodiment are fields, not frames. By virtue of its reduced number of constituent scan lines, each video field comprises left and right images compressed in the vertical direction in an amount equal to the horizontal compression produced by the anamorphic lenses. Thus, video fields in the second embodiment contain anamorphically rectified left and right images each having the exemplary 4:3 aspect ratio of the entire CCD circuit 72. For example, FIGS. 7C and 7D illustrate a resultant display field representative of the images cast on the CCD circuit 72 corresponding to FIGS. 7A and 7B, respectively in the second embodiment. With every other scan line (51 or 52) of CCD circuit 72 utilized in a field, the left image 509 and right image 511 are each displayed in the exemplary 4:3 aspect ratio and at unity anamorphic ratio.

Because the images displayed under the second embodiment are drawn from video fields having half the number of scan lines as video frames, the resolution of the images is reduced. It will be appreciated by those skilled in the art, however, that high resolution video frames, comprising fields composed of both even and odd scan lines, may be obtained from the fields of the second embodiment of the present invention. Techniques, well known in the art, may be used to expand the horizontal resolution of the fields, thereby allowing delivery of full resolution video frames at an exemplary 60 Hz rate, with the frame delivered to each eye representing the full field of view of the camera unit.

In an exemplary second embodiment of the present invention, the first and second fields each become available at a 30 Hz rate, thereby providing an overall field update rate of 60 Hz. Since each of the fields contains left and right images, each in the proper aspect ratio, images may be displayed at the exemplary rate of 60 Hz; twice the rate of image display for the first embodiment. Furthermore, due to the anamorphic lenses, each video field comprises left and right images themselves having an aspect ratio equal to that of the entire image sensor. FIG. 7B illustrates that a first field 100a comprises a left and right image and represents the odd (or even) scan lines of the frame. A second field 100b is available 1/60 of a second later and comprises a left and a right image representing the even (or odd) scan lines of the frame. For stereo display, the left and right images from a field are separated and can be displayed individually to the left and right eyes, respectively.

Figure 8A:
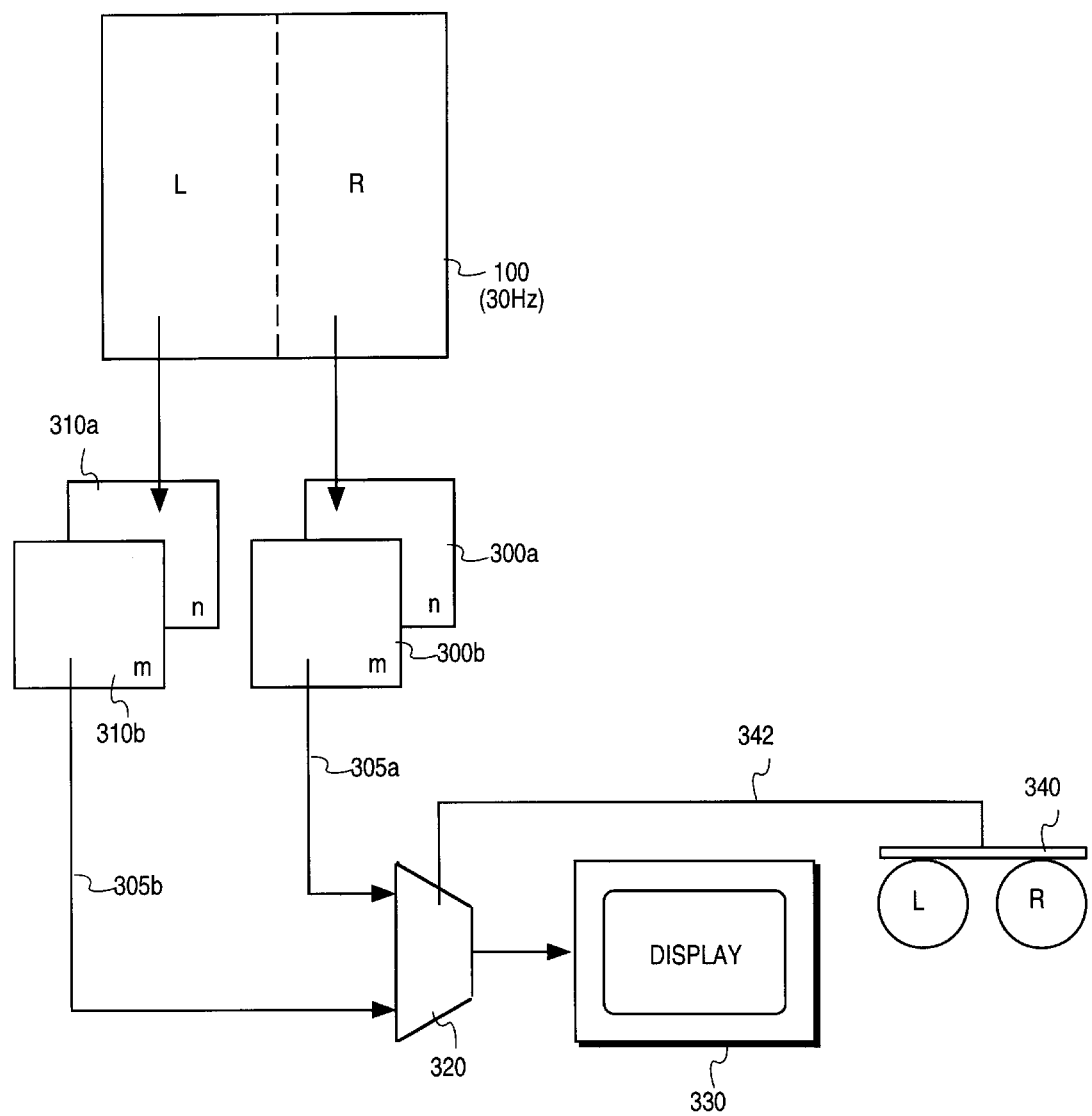
FIG. 8A illustrates a stereo video playback system for playing back stereo video recorded by the second embodiment of the present invention.

FIG. 8A illustrates an exemplary stereo video playback system for playing back stereo video recorded with the first embodiment of the present invention. A frame of video information 100 is received at 30 Hz and loaded into a first frame buffer pair 310a and 300a of a double buffer circuit. Buffers 310a and 300a comprise memory n. As information is loaded into buffers 310a and 300a, another pair of memories 310b and 300b is read by well known video generation circuitry to generate output video signals over bus 305b and 305a, respectively. Buffers 310b and 300b comprise memory m. After display of an image stored in memory m, the pointers, known as load and read pointers, to memories m and n are transposed, that is, the load pointer is made to point to the memory location previously pointed to by the read pointer and vice-versa. This technique, known as double buffering, allows the images in memory n to be displayed while new images are stored in memory m, and vice-versa.

Video generation circuitry (e.g., display generator 725 of FIG. 8C), reading either memory buffer n 310a or memory buffer m 310b to display the left image, outputs a video signal over bus 305b. Similarly, video generation circuitry reading either memory n or m (buffers 300a or 300b) to display the right image outputs a video signal over bus 305a. The video generation circuit can generate either analog or digital video signals. Signals 305a and 305b are fed to a multiplexer circuit 320 controlled by a select control line 342. The select control line 342 is also coupled to gate left and right lenses located on a special headframe 340. The output of the multiplexer circuit 320 is fed to a display screen 330 for rendering an image on the display. The left and right lenses of the headframe 340 are capable of being driven opaque or clear, for example, by using LCD shutter lenses.

When select line 342 generates a signal selecting the left image to be rendered on the display 330, the right lens of the headframe 340 is driven opaque and the left lens is cleared. When the right image is rendered on the display 330, the left lens of the headframe 340 is driven opaque and the right lens is cleared. In this manner, when viewed by a viewer, the left eye perceives only the left image and right eye perceives only the right image.

Since left and right images are presented at a rate of 30 Hz for the frame 100, the select line 342 operates at a rate of at least 60 Hz to provide the required gating to the left and right eyes for stereo viewing. The left and right images of frame 100 are displayed in their proper aspect ratio.

It will be appreciated by those skilled in the art, that there are alternative means to generate displays for stereo viewing. For example, rather than shuttering left and right eyepieces, alternating left and right views may be produced with an LCD polarizer placed over the display 330 and switched between alternate polarization states by the select line 342. A viewer, wearing eyepieces each attuned to one of the two alternately polarized LCD states, perceives only the left image with the left eye and only the right image with the right eye.

Figure 8B:
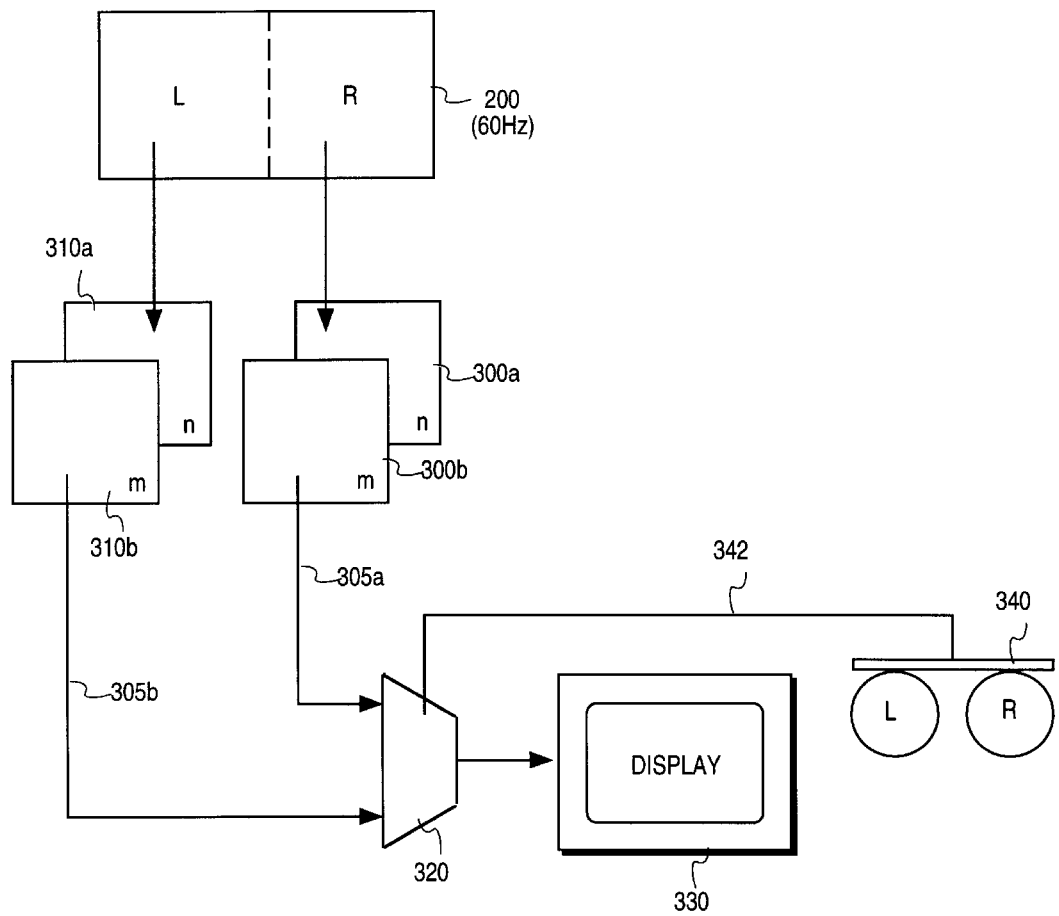
FIG. 8B illustrates a stereo video playback system for playing back stereo video recorded by the second embodiment of the present invention.
Figure 9C:
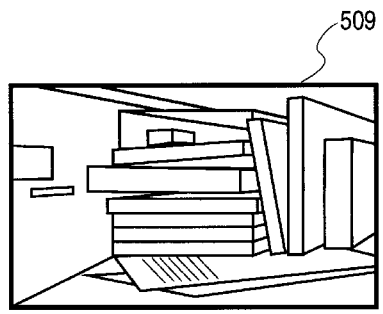
FIGS. 9C and 9D illustrate left and right field images as generated from reading a single CCD circuit using the second embodiment of the present invention.
Figure 9D:

FIG. 8B illustrates an exemplary stereo video playback system for playing back stereo video recorded with the second embodiment of the present invention. The electronics utilized in the system of FIG. 8B is analogous to the system of FIG. 8A. However, the displayed images are received from video fields, not frames. Fields 200 are presented to the double buffering memories n and m at 60 Hz. These are read by the video generation circuitry and input to multiplexer circuit 320. The select line 342 carries a select signal that alternates at 120 Hz to present the left image from field 200 on display 330 and then to present the right image from field 200 on display 330. The left and right lenses on frame 340 alternate accordingly at 120 Hz to allow visualization of the left and right images in synchronization with the display of the left and right images, respectively, on display 330. The left and right images of field 200 are displayed in their proper aspect ratio for viewing (e.g., as shown in FIG. 9C and FIG. 9D).

It will be appreciated that the video frames 100 and fields 200 as shown in FIG. 8A and 8B, respectively, can originate from previously recorded video signals or directly from a stereo video camera system implemented in accordance with the present invention.

Figure 8C:
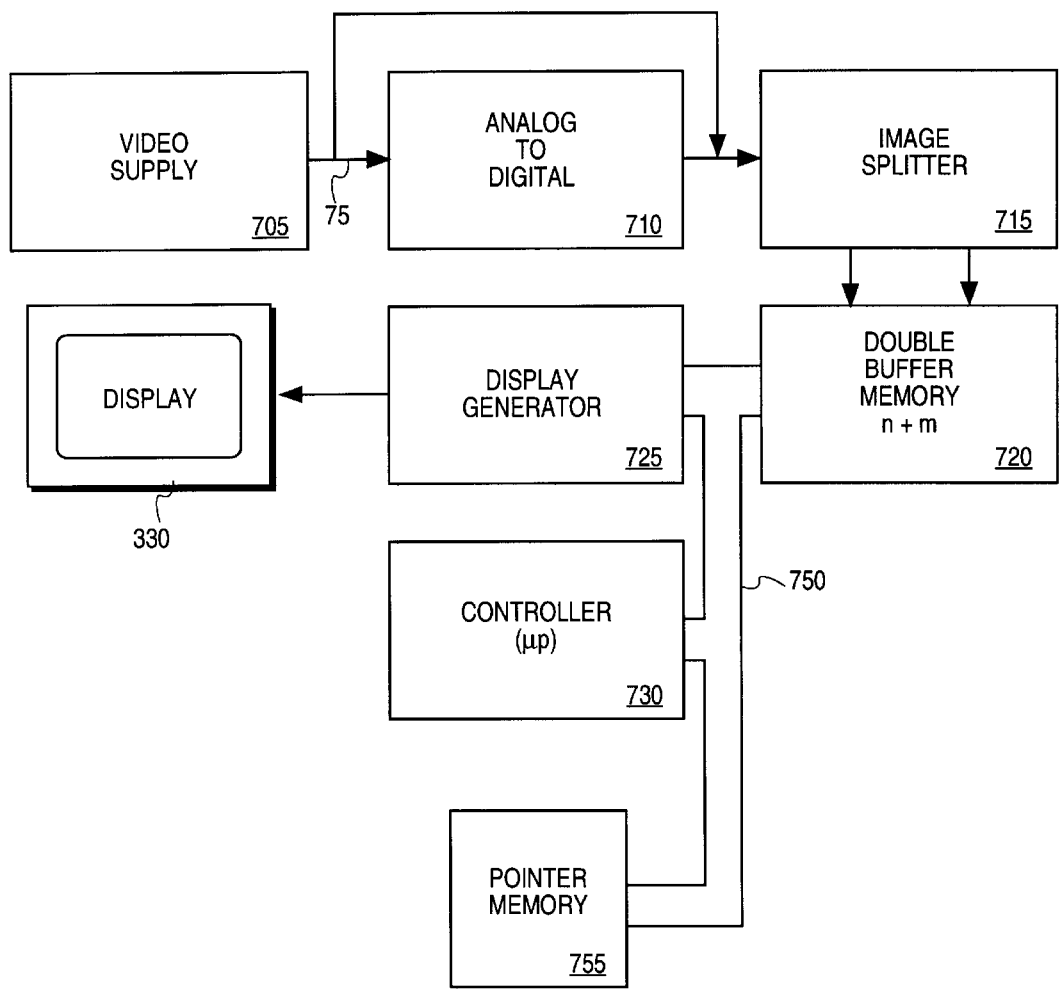
FIG. 8C is an exemplary playback system for playing back stereo video recorded with the first or second embodiments of the present invention.

FIG. 8C illustrates an exemplary system that can be used for both embodiments shown in FIG. 8A and FIG. 8B for playback of stereo video signals. Stereo video is supplied over line 75 by supply 705. If in analog form, the video signal is first processed by an analog to digital converter 710 before presentation to an image splitter 715. The image splitter 715 digitally separates the left and right images of the stereo video signal. If video frames are to be displayed, as under the first embodiment of the present invention, frames are split and if video fields are to be displayed, as with the second embodiment, fields are split by the image splitter 715. Any number of well known circuits can be used to implement the image splitter 715.

Double buffer memory 720 comprises memories n and m and is read by a display generator 725 to generate video output signals to drive the display 330. Pointers for reading and writing double buffer memory 720 are stored in pointer memory 755. A controller 730 controls the writing of information into memories 720 and 755 and the reading of information from memories 720 and 755 to implement the playback systems shown in FIGS. 8A and 8B. A bus 750 couples controller 730 to double buffer memory 720, pointer memory 755 and display generator 725.

Figure 10A:
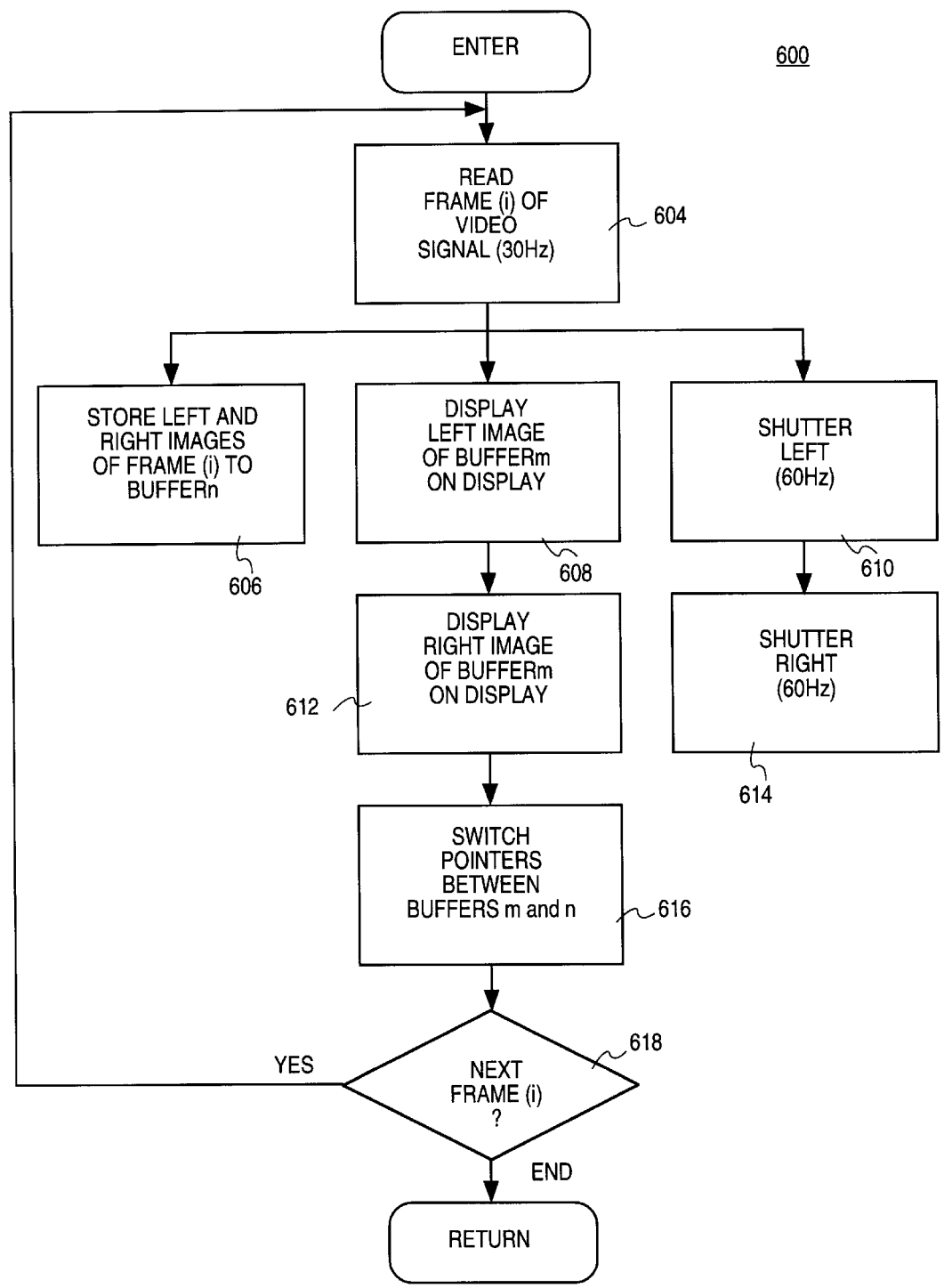
FIG. 10A is a flow diagram illustrating steps of the playback system used by the present invention for stereo video recorded by the first embodiment of the present invention.

FIG. 10A illustrates a method of video playback using the system as shown in FIG. 8A. The method 600 begins at step 604 wherein a frame (e.g., frame$_i$) of the stereo video is read at an exemplary rate of 30 Hz. As previously discussed, this frame contains a left and a right image. The left and right images are then stored into memory n of the double buffer configuration at step 606. At step 608, simultaneous to step 606, video generation circuitry reads memory m of the double buffer to render the left image onto a display. Simultaneous with steps 608 and 606, at step 610 the present invention shutters left so that the right lens of the headframe 340 is driven opaque and the left lens is cleared. In this exemplary embodiment, the left and right lenses are each shuttered at a rate of at least 60 Hz.

At step 612, after display of the left image, the right image of the frame 100 from memory m is rendered on the display 330. Simultaneous to step 612, at step 614, the present invention shutters right so that the left lens of headframe 340 is driven opaque and the right lens is cleared. Next, at step 616, the present invention transposes the buffer pointers to memory n and m so that memory m will now receive the next video frame and memory n will be used to supply video information most recently stored at step 606 to the display 330. At decisional step 618, the present invention determines if another frame is to be displayed and if so returns to step 604 to process frame$_{+1}$. If not, the method 600 terminates. It will be appreciated that the order of presentation of the left and right images is arbitrary regarding the processing of steps 608 and 612 and associated steps 610 and 614.

Figure 10B:
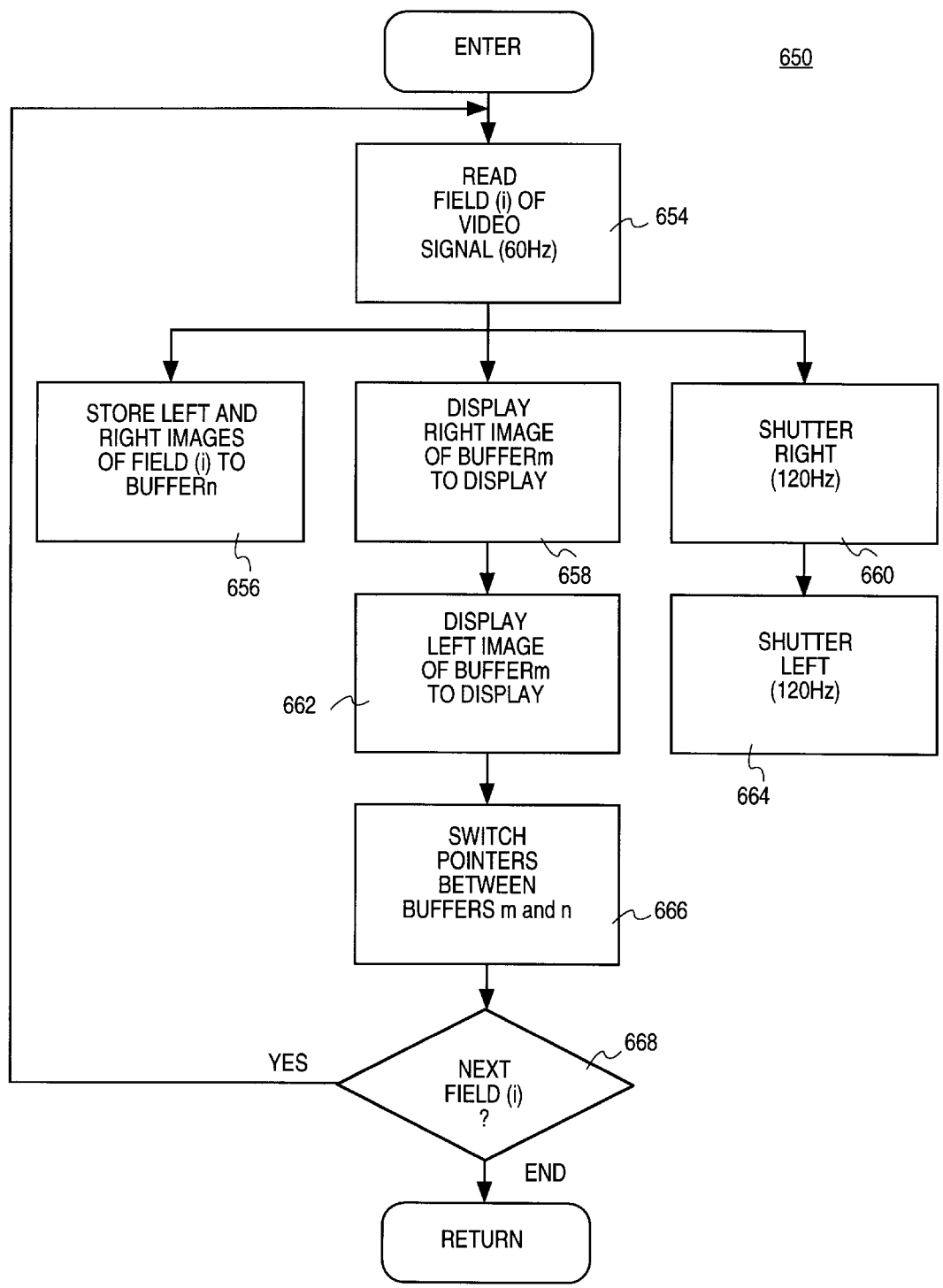
FIG. 10B is a flow diagram illustrating steps of the playback system used by the present invention for stereo video recorded by the second embodiment of the present invention.

FIG. 10B illustrates a method 650 of video playback using the system as shown in FIG. 8B. The method 650 is similar to method 600 except that rather than reading frames into buffer memory at 30 Hz, fields are read into buffer memory at 60 Hz. Also, the left and right lenses of headframe 340 are each shuttered at 120 Hz rather than 60 Hz. Under method 650, individual fields containing a left and right image each are processed in lieu of frames.

As described above, the first and second embodiments of the present invention offer an optical system that can be coupled to a conventional video camera system to generate stereo video images. The video camera need employ only a single CCD circuit and conventional video sampling and signal generation electronics. By simultaneously casting a left and right image on the single CCD circuit and sampling both images in a single sampling of the CCD, the left and right images are captured substantially simultaneously, thereby avoiding the pseudo-stereo effect which plagues prior art systems employing time separated left and right image acquisition. The first and second embodiments of the present invention, as described above, generate stereo video signals. The stereo video signals, thus produced, can be played back for stereo visualization using conventional frames and fields as described above.

Similarly, the third embodiment of the present invention offers an optical system that can be coupled to a conventional video camera system to generate stereo video images. By casting each right and left image individually on the entire single CCD circuit, full resolution frames of each the left and the right image can be obtained using conventional video sampling and signal generation electronics. Despite the fact that this embodiment of the present invention suffers from the pseudo-stereo effect when viewing moving objects, it represents a means for capturing full resolution stereo video data for relatively static scenes. Such data can then be processed by a computer to determine the three dimensional position of objects of interest.

The preferred embodiments of the present invention, a mechanism and method for recording and playback of stereo video with a camera system having standard electronics and an uniquely adapted optical system, are thus described.

While the present invention has been described in particular embodiments, the present invention should not be construed as limited by such embodiments, but rather construed according to the following claims.

What is claimed is:

1. A camera for generating a stereo video signal, said camera comprising:
   an image sensor responsive to an image projected thereon;
   an optical assembly having first and second optical channels that include respective focusing lenses disposed to focus substantially coincident portions of respective fields of view of the first and second optical channels onto abutting regions of said image sensor; and
   a video generation circuit coupled to sample the abutting regions of said image sensor to generate said stereo video signal.

2. A camera as described in claim 1 wherein said video generation circuit samples the abutting regions of said image sensor substantially simultaneously.

3. A camera as described in claim 1 wherein the first and second optical channels have respective first and second viewpoints separated by a predetermined distance causing stereo differentiation between the respective fields of view of the first and second optical channels.

4. A camera as described in claim 1 wherein said video generation circuit samples said image sensor to generate video frames, each of the video frames including a left image and a right image corresponding to the portions of the respective fields of view of the first and second optical channels.

5. A camera as described in claim 4 wherein said image sensor has an aspect ratio and the left image and the right image each have an aspect ratio substantially equal to one-half the aspect ratio of said image sensor.

6. A camera as described in claim 1 wherein said video generation circuit samples said image sensor to generate video fields, each of the video fields representing one of the portions of the respective fields of view of the first and second optical channels.

7. A camera as described in claim 6 wherein the first optical channel and the second optical channel respectively comprise a first optical element and a second optical element to anamorphically reduce in a first axis the portions of the respective fields of view of the first and second optical channels so that images represented by each of the video fields each have a substantially unity anamorphic ratio.

8. A camera as described in claim 7 wherein said image sensor has an aspect ratio and the images represented by each of the video fields each have an aspect ratio substantially equal to the aspect ratio of said image sensor.

9. A camera for generating a stereo video signal, said camera comprising:
   an image sensor responsive to an image projected thereon;
   first and second optical channels having respective focusing lenses that are translatable in a direction transverse to their respective optical axes to project onto abutting regions of said image sensor portions of respective fields of view of the first and second optical channels that are substantially coincident; and
   a video generation circuit coupled to sample the abutting regions of said image sensor to generate said stereo video signal.

10. A camera as described in claim 9 wherein said video generation circuit samples the abutting regions of said image sensor substantially simultaneously.

11. A video system for displaying a three dimensional view, said video system comprising:
   an image sensor responsive to an image projected thereon;
   an optical assembly having first and second optical channels that include respective focusing lenses disposed to focus substantially coincident portions of respective fields of view of the first and second optical channels onto abutting regions of said image sensor;

a video generation circuit coupled to sample the abutting regions of said image sensor to generate a stereo video signal; and a video display device coupled to said video generation circuit for receiving the stereo video signal and to display a three dimensional view therefrom.

12. A video system as in claim 11 wherein said video display device comprises a display;

a buffer memory to store the stereo video signal;

a display generator coupled to said buffer memory to sample from the stereo video signal stored therein a first image and a second image corresponding to the portions of respective fields of view of the first and second optical channels, said display generator alternately rendering the first and second images onto said display; and a viewing device for viewing the first image rendered onto said display only by a first eye and for viewing the second image rendered onto said display only by a second eye, wherein the viewing by the first eye is alternated with the viewing by the second eye synchronously with the rendering of the first and second images onto said display.

13. In a camera, a method of generating a stereo video signal, said method comprising the steps of:

positioning a first focusing lens in a first optical assembly to select a portion of a field of view of the first optical assembly;

positioning a second focusing lens in a second optical assembly to select a portion of a field of view of the second optical assembly the portion of the field of view of the second optical assembly being substantially coincident with the portion of the field of view of the first optical assembly;

projecting the portions of the fields of view of the first and second optical assemblies onto respective abutting regions of an image sensor; and sampling the abutting regions of the image sensor to generate said stereo video signal.

14. In a video system, a method of displaying a three dimensional view, said method comprising the steps of:

positioning a first focusing lens in a first optical assembly to select a portion of a field of view of the first optical assembly:

positioning a second focusing lens in a second optical assembly to select a portion of a field of view of the second optical assembly, the portion of the field of view of the second optical assembly being substantially coincident with the portion of the field of view of the first optical assembly;

projecting the portions of the fields of view of the first and second optical assemblies onto respective abutting regions of an image sensor; and sampling the abutting regions of the image sensor to generate a stereo video signal; and displaying a three dimensional view based on the stereo video signal.

15. A method as described in claim 14 wherein said step of displaying a three dimensional view includes the steps of:

storing the stereo video signal in a buffer memory;

sampling from the stereo video signal stored in the buffer memory first and second images corresponding to the portions of the fields of view of the first and second optical assemblies;

alternately rendering the first and second images onto a display; and enabling a view, in a viewing device, of the first image rendered onto the display only by a first eye and of the second image rendered onto the display only by a second eye, wherein the viewing by the first eye is alternated with the viewing by the second eye synchronously with the rendering of the first and second images onto the display.

16. A method as described in claim 14 wherein said step of displaying a three dimensional view includes the steps of:

(a) reading a first video image comprised by a first video frame from a memory buffer pointed to by a read pointer and rendering the first video image onto a display the first video image corresponding to the portion of the field of view of the first optical assembly;

(b) reading a second video image comprised by the first video frame from the memory buffer pointed to by the read pointer and rendering the second video image onto the display, the second video image corresponding to the portion of the field of view of the second optical assembly;

(c) storing a second video frame from said stereo video signal in a memory buffer pointed to by a load pointer, said step of storing occurring within the time required to accomplish steps (a) and (b); and (d) transposing the load and read pointers upon completion of steps (a) and (b);

(e) enabling a view of the first video image rendered onto the display only by a first eye; and (f) enabling a view of the second video image rendered onto the display only by a second eye.

17. The method of claim 14 wherein said step of positioning a first focusing lens includes the step of translating the first focusing lens in a direction transverse to its optical axis.

18. A camera as described in claim 14 further comprising the step of anamorphically reducing the the respective portions of the fields of view of the first and second optical assemblies in a first axis.

19. A method as described in claim 18 wherein said step of displaying a three dimensional view includes the steps of:

(a) reading a first video image comprised by a first video field from a memory buffer pointed to by a read pointer and rendering the first video image onto a display, the first video image corresponding to the portion of the field of view of the first optical assembly;

(b) reading a second video image comprised by the first video field from the memory buffer pointed to by the read pointer and rendering the second image onto the display, the second video image corresponding to the portion of the field of view of the second optical assembly;

(c) storing a second video field from said stereo video signal in a memory buffer pointed to by a load pointer, said step of storing occurring within the time required to accomplish steps (a) and (b); and (d) transposing the load and read pointers upon completion of steps (a) and (b);

(e) enabling a view of the first video image rendered onto the display only by a first eye; and (f) enabling a view of the second video image rendered onto the display only by a second eye.

* * * * *